US012589491B2

(12) United States Patent
Zhou et al.

(10) Patent No.: US 12,589,491 B2
(45) Date of Patent: Mar. 31, 2026

(54) METHODS, SYSTEMS, AND DEVICES FOR MOTION CONTROL OF AT LEAST ONE WORKING HEAD

(71) Applicant: ZHEJIANG HUARAY TECHNOLOGY CO., LTD., Hangzhou (CN)

(72) Inventors: Shang Zhou, Hangzhou (CN); Kai Wang, Hangzhou (CN); Yu Liu, Hangzhou (CN); Lu Zhou, Hangzhou (CN); Ming Li, Hangzhou (CN)

(73) Assignee: ZHEJIANG HUARAY TECHNOLOGY CO., LTD., Hangzhou (CN)

( * ) Notice: Subject to any disclaimer, the term of this patent is extended or adjusted under 35 U.S.C. 154(b) by 149 days.

(21) Appl. No.: 18/414,405

(22) Filed: Jan. 16, 2024

(65) Prior Publication Data

US 2024/0149442 A1 May 9, 2024

Related U.S. Application Data

(63) Continuation of application No. PCT/CN2022/107038, filed on Jul. 21, 2022.

(30) Foreign Application Priority Data

Jul. 28, 2021 (CN) .......................... 202110853667.6

(51) Int. Cl.
B25J 9/16 (2006.01)
B25J 15/00 (2006.01)
(Continued)

(52) U.S. Cl.
CPC ........... B25J 9/1628 (2013.01); B25J 9/1664 (2013.01); B25J 15/0019 (2013.01);
(Continued)

(58) Field of Classification Search
CPC .... B25J 9/1628; B25J 9/1664; B25J 15/0019; B25J 9/1697; G06T 1/0014; G06T 7/001;
(Continued)

(56) References Cited

U.S. PATENT DOCUMENTS

2016/0016312 A1* 1/2016 Lawrence, III ........ B25J 9/1671
901/41
2018/0161979 A1* 6/2018 Okamoto ............... B25J 9/1664
(Continued)

FOREIGN PATENT DOCUMENTS

CN 103690191 A 4/2014
CN 104776810 B 3/2016
(Continued)

OTHER PUBLICATIONS

The Extended European Search Report in European Application No. 22848395.4 mailed on Sep. 13, 2024, 9 pages.
(Continued)

*Primary Examiner* — Dylan M Katz
(74) *Attorney, Agent, or Firm* — METIS IP LLC

(57) ABSTRACT

The present disclosure provides a method for motion control of at least one working head. The method may include obtaining a target region of a subject based on a scan of a high-precision measuring device. The method may also include determining depth information corresponding to the target region based on the target region. The method may further include determining a motion trajectory of the at least one working head based on the depth information.

17 Claims, 20 Drawing Sheets

(51) Int. Cl.

| | | |
|---|---|---|
| *G06T 1/00* | (2006.01) | |
| *G06T 7/00* | (2017.01) | |
| *G06T 7/215* | (2017.01) | |
| *G06T 7/246* | (2017.01) | |
| *G06T 7/60* | (2017.01) | |

(52) U.S. Cl.

CPC ............ *G06T 1/0014* (2013.01); *G06T 7/001* (2013.01); *G06T 7/215* (2017.01); *G06T 7/248* (2017.01); *G06T 7/60* (2013.01); *G06T 2207/10028* (2013.01); *G06T 2207/30164* (2013.01); *G06T 2207/30241* (2013.01)

(58) Field of Classification Search

CPC ........... G06T 7/215; G06T 7/248; G06T 7/60; G06T 2207/10028; G06T 2207/30164; G06T 2207/30241; G06T 7/12; G06T 7/13; G06T 7/11; G06T 7/50; G05B 2219/36248; G05B 2219/37555; G05B 2219/40425; G05B 19/18; G05B 19/4093; G05B 19/19; G05B 19/41; G01B 11/00

See application file for complete search history.

(56) References Cited

U.S. PATENT DOCUMENTS

| | | | |
|---|---|---|---|
| 2019/0266741 A1 | 8/2019 | Uehara | |
| 2022/0113711 A1 | 4/2022 | Nakayama et al. | |
| 2022/0253039 A1 | 8/2022 | Ayade | |

FOREIGN PATENT DOCUMENTS

| | | | |
|---|---|---|---|
| CN | 105719348 A | 6/2016 | |
| CN | 105149794 B | 9/2016 | |
| CN | 107633523 A | 1/2018 | |
| CN | 107900534 A | 4/2018 | |
| CN | 108724183 A | 11/2018 | |
| CN | 106949848 B | 11/2019 | |
| CN | 110977982 A | 4/2020 | |
| CN | 112132957 A | 12/2020 | |
| CN | 112381921 A | 2/2021 | |
| CN | 112414326 A | 2/2021 | |
| CN | 110161485 B | 3/2021 | |
| CN | 112475628 A | 3/2021 | |
| CN | 110118974 B | 5/2021 | |
| CN | 113344952 A | 9/2021 | |
| EP | 3042255 B1 | 7/2019 | |
| WO | 2009037181 A1 | 3/2009 | |

OTHER PUBLICATIONS

Xiong, Huiyuan, Research on the Techniques to Ensure Accuracy of Line Structured Light Visional Measuring System and Applications, Doctoral dissertation of Central South University, 2009, 143 pages.

Tan, Wen et al., Research and application of 3D laser flatness measurement system based on machine vision, Chinese Journal of Scientific Instrument, 41(1): 241-249, 2020.

International Search Report in PCT/CN2022/107038 mailed on Oct. 19, 2022, 5 pages.

Written Opinion in PCT/CN2022/107038 mailed on Oct. 19, 2022, 5 pages.

First Office Action in Chinese Application No. 202110853667.6 mailed on Sep. 13, 2021, 10 pages.

\* cited by examiner

<u>300</u>

400

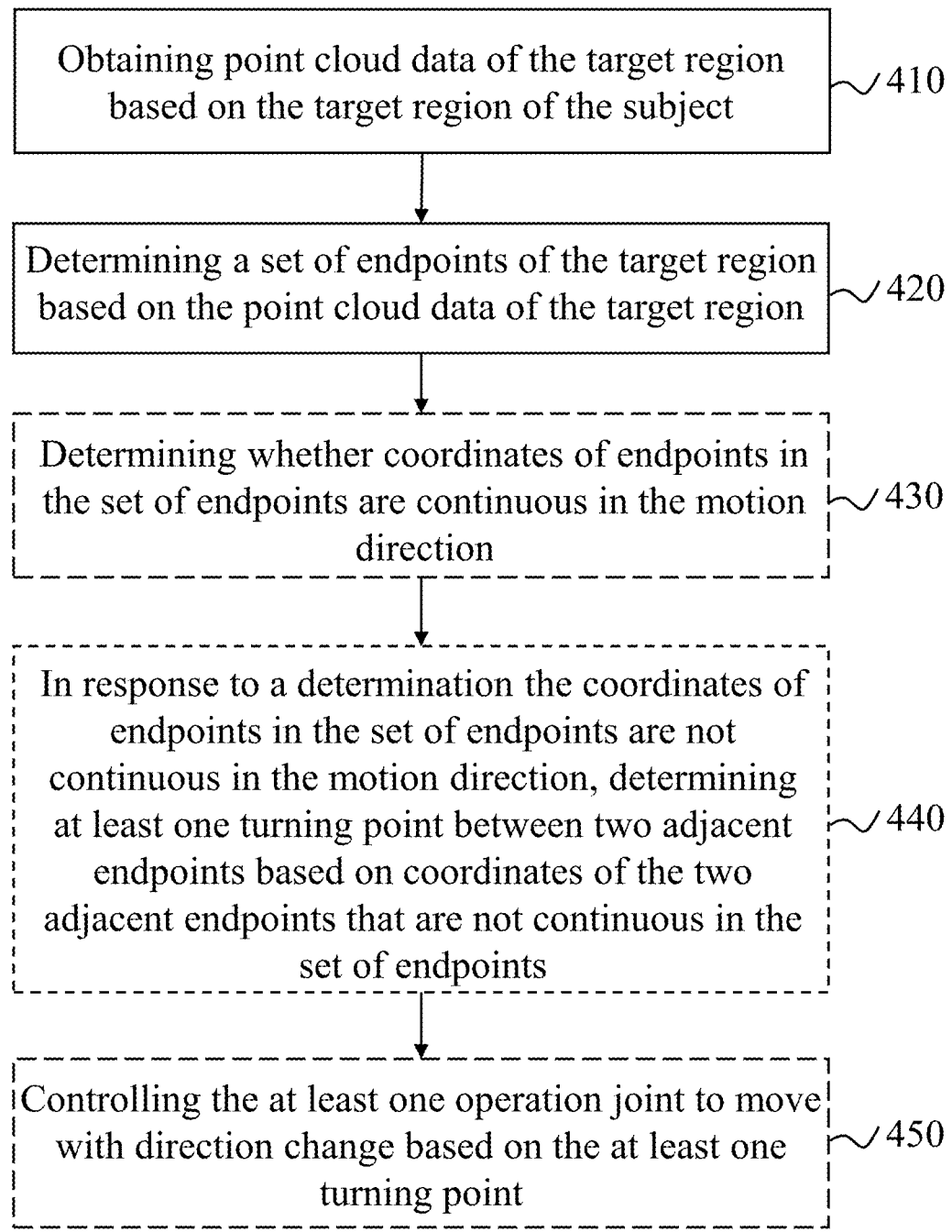

Obtaining point cloud data of the target region based on the target region of the subject ⟿410

Determining a set of endpoints of the target region based on the point cloud data of the target region ⟿420

Determining whether coordinates of endpoints in the set of endpoints are continuous in the motion direction ⟿430

In response to a determination the coordinates of endpoints in the set of endpoints are not continuous in the motion direction, determining at least one turning point between two adjacent endpoints based on coordinates of the two adjacent endpoints that are not continuous in the set of endpoints ⟿440

Controlling the at least one operation joint to move with direction change based on the at least one turning point ⟿450

FIG. 4

Left
endpoint of
the groove

Right
endpoint of
the groove

Pattern
region

Groove
region

Burr region

600

Determining a first set of endpoints and a second set of endpoints of the target region based on the point cloud data of the target region   610

Determining a set of center points based on the first set of endpoints and the second set of endpoints   620

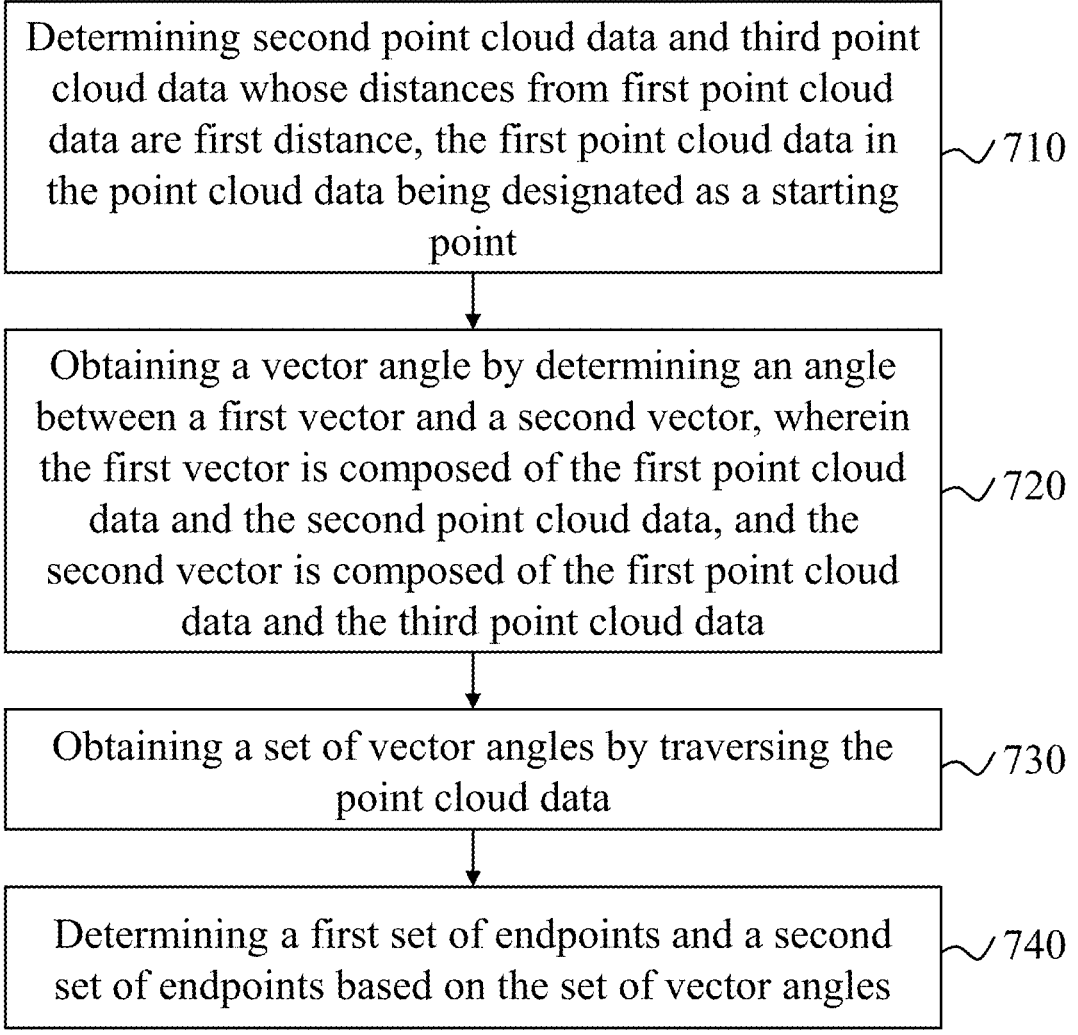

700

Determining second point cloud data and third point cloud data whose distances from first point cloud data are first distance, the first point cloud data in the point cloud data being designated as a starting point                                                              ~710

Obtaining a vector angle by determining an angle between a first vector and a second vector, wherein the first vector is composed of the first point cloud data and the second point cloud data, and the second vector is composed of the first point cloud data and the third point cloud data                                                              ~720

Obtaining a set of vector angles by traversing the point cloud data                                                              ~730

Determining a first set of endpoints and a second set of endpoints based on the set of vector angles                                                              ~740

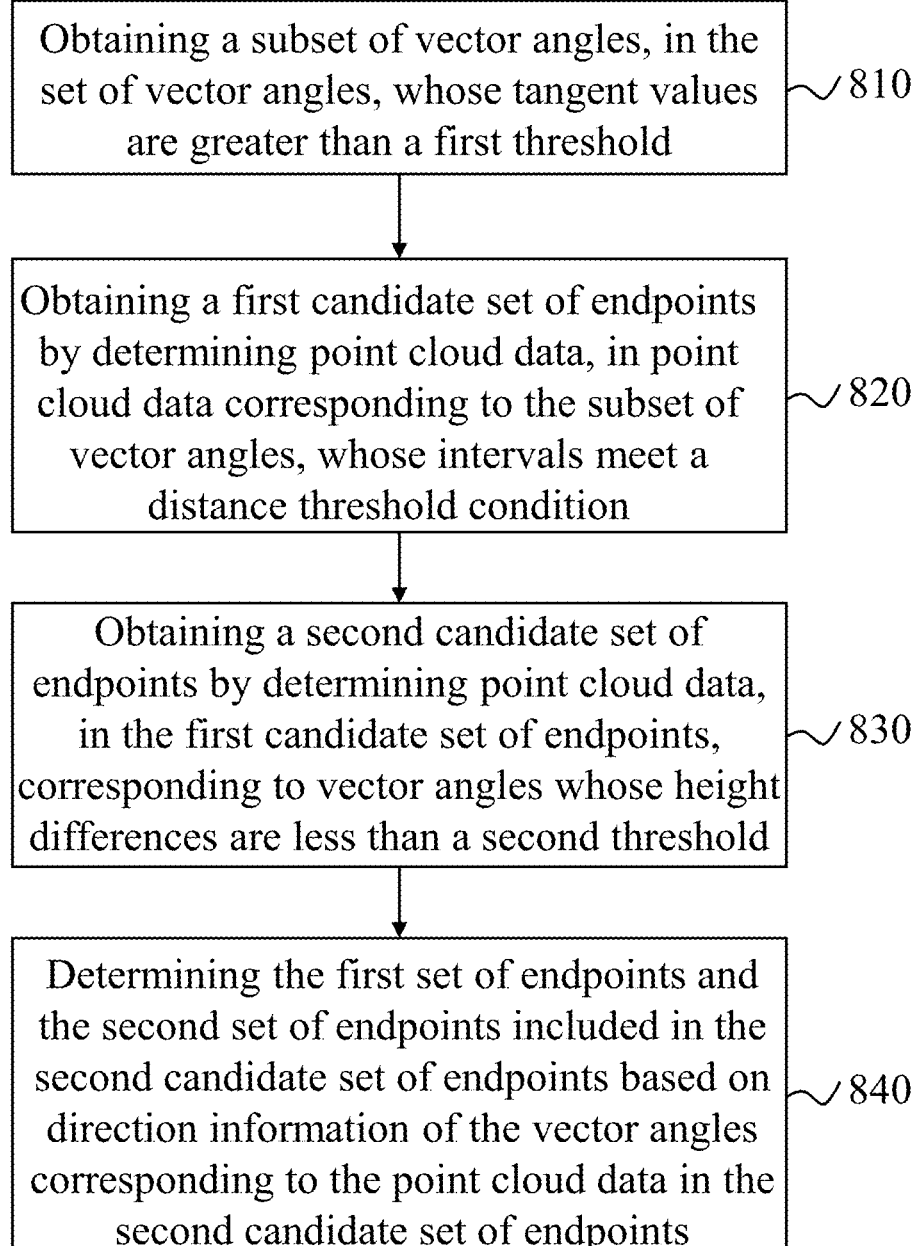

Obtaining a subset of vector angles, in the set of vector angles, whose tangent values are greater than a first threshold ~810

Obtaining a first candidate set of endpoints by determining point cloud data, in point cloud data corresponding to the subset of vector angles, whose intervals meet a distance threshold condition ~820

Obtaining a second candidate set of endpoints by determining point cloud data, in the first candidate set of endpoints, corresponding to vector angles whose height differences are less than a second threshold ~830

Determining the first set of endpoints and the second set of endpoints included in the second candidate set of endpoints based on direction information of the vector angles corresponding to the point cloud data in the second candidate set of endpoints ~840

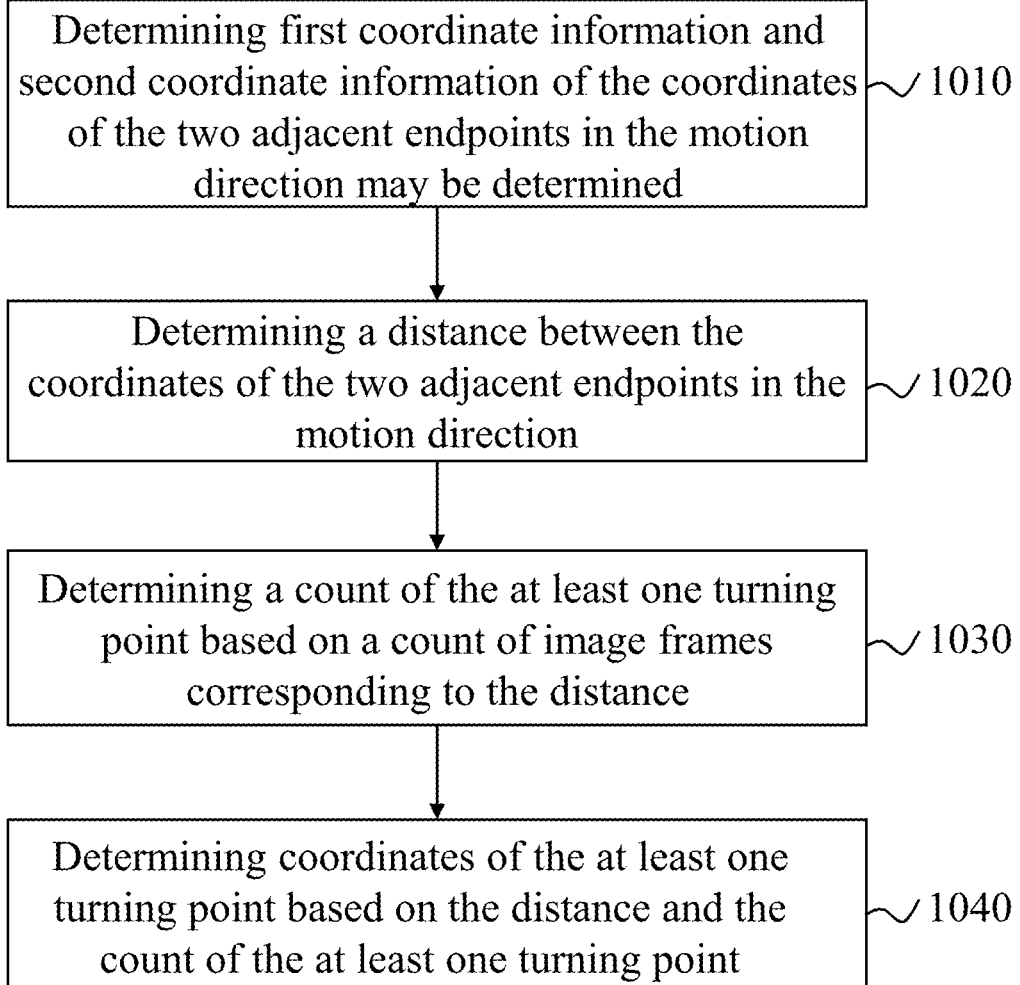

Determining first coordinate information and second coordinate information of the coordinates of the two adjacent endpoints in the motion direction may be determined ~/ 1010

Determining a distance between the coordinates of the two adjacent endpoints in the motion direction ~/ 1020

Determining a count of the at least one turning point based on a count of image frames corresponding to the distance ~/ 1030

Determining coordinates of the at least one turning point based on the distance and the count of the at least one turning point ~/ 1040

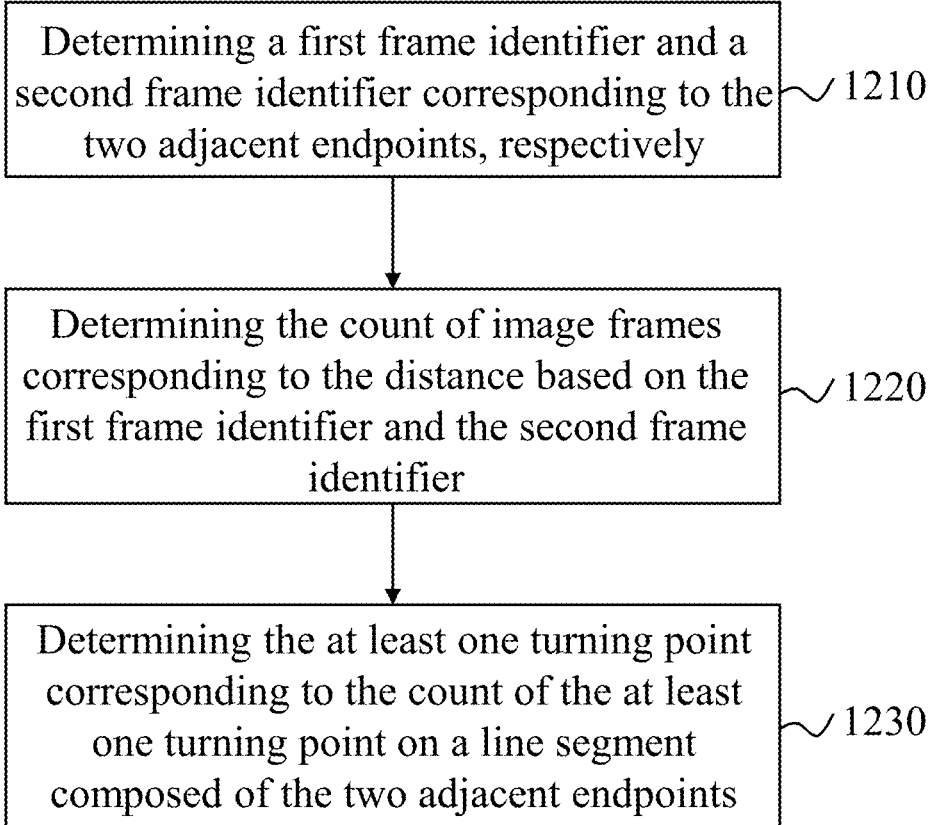

Determining a first frame identifier and a second frame identifier corresponding to the two adjacent endpoints, respectively ~ 1210

Determining the count of image frames corresponding to the distance based on the first frame identifier and the second frame identifier ~ 1220

Determining the at least one turning point corresponding to the count of the at least one turning point on a line segment composed of the two adjacent endpoints ~ 1230

FIG. 12

METHODS, SYSTEMS, AND DEVICES FOR MOTION CONTROL OF AT LEAST ONE WORKING HEAD

CROSS-REFERENCE TO RELATED APPLICATIONS

This application is a continuation of International Application No. PCT/CN2022/107038 filed on Jul. 21, 2022, which claims priority to Chinese Patent Application No. 202110853667.6, filed on Jul. 28, 2021, the contents of each of which are incorporated herein by reference in their entirety.

TECHNICAL FIELD

The present disclosure relates to the field of image processing, in particular, to a method, a system, and a device for motion control of at least one working head.

BACKGROUND

A working head is a device that may directly complete or cooperate with specific tools to complete certain process actions (e.g., cutting, dispensing, welding, etc.). Generally, the working head needs to control the motion state thereof (e.g., a motion trajectory, changing direction or not) during the motion process, so that a product processed by the working head meets a certain process requirement. For example, some products may have rough edges of different widths or lengths during production. The working head may cut the rough edges produced during production, and the cut surface of the products after being cut is required to be smooth. Therefore, it is particularly important to provide a motion control scheme of the working head, to determine the motion trajectory of the working head and whether the motion of the working head needs to change direction, thus the products may be processed efficiently and accurately.

SUMMARY

One aspect of the present disclosure may provide a method for motion control of at least one working head. The method may include obtaining a target region of a subject based on a scan of a high-precision measuring device; determining depth information corresponding to the target region based on the target region; and determining a motion trajectory of the at least one working head based on the depth information.

In some embodiments, the method may further include determining scanning information of the high-precision measuring device based on coding information of an encoder; and determining the depth information based on the scanning information.

In some embodiments, the determining a motion trajectory of the at least one working head based on the depth information may include determining a motion region of the at least one working head based on the depth information; and determining the motion trajectory based on the motion region.

In some embodiments, the determining the motion trajectory based on the motion region may include determining a motion reference path of the at least one working head based on the motion region and a motion direction; and determining the motion trajectory based on the motion reference path.

In some embodiments, the motion reference path may include a center line path of the motion region or a path parallel to the center line in the motion region.

In some embodiments, the motion region may include a plurality of sub-regions, and the determining the motion trajectory based on the motion region may include determining whether two adjacent sub-regions among the plurality of sub-regions are continuous in the motion direction; and determining whether to add a turning trajectory based on a determination whether the two adjacent sub-regions among the plurality of sub-regions are continuous in the motion direction.

In some embodiments, the determining whether to add a turning trajectory based on a determination whether the two adjacent sub-regions among the plurality of sub-regions are continuous in the motion direction may include in response to a determination the two adjacent sub-regions among the plurality of sub-regions are not continuous in the motion direction, adding the turning trajectory in a deviation region between the two adjacent sub-regions.

In some embodiments, the method may further include controlling the at least one working head to move based on the motion trajectory of the at least one working head.

In some embodiments, the at least one working head may include a first working head and a second working head, a distance between the first working head and the second working head may be constant, and the controlling the at least one working head to move based on the motion trajectory of the at least one working head may include controlling the first working head and the second working head to move based on the motion trajectory of the first working head.

In some embodiments, the at least one working head may include a first working head and a second working head, the motion trajectory of the at least one working head may include a first motion trajectory of the first working head and a second motion trajectory of the second working head, and the controlling the at least one working head to move based on the motion trajectory of the at least one working head may include: controlling the first working head to move based on the first motion trajectory; and controlling the second working head to move based on the second motion trajectory.

In some embodiments, the method may further include obtaining point cloud data of the target region based on the target region of the subject; and determining a set of endpoints of the target region based on the point cloud data of the target region, wherein the depth information may include the point cloud data and the set of endpoints.

In some embodiments, the determining a set of endpoints of the target region based on the point cloud data of the target region may include determining second point cloud data and third point cloud data whose distances from first point cloud data are first distance, the first point cloud data in the point cloud data being designated as a starting point; obtaining a vector angle by determining an angle between a first vector and a second vector, wherein the first vector may be composed of the first point cloud data and the second point cloud data, and the second vector may be composed of the first point cloud data and the third point cloud data; obtaining a set of vector angles by traversing the point cloud data; and determining a first set of endpoints and a second set of endpoints based on the set of vector angles, wherein the first set of endpoint and the second set of endpoints may belong to the set of endpoints.

In some embodiments, the determining a set of endpoints of the target region based on the point cloud data of the target region may include determining second point cloud data and third point cloud data whose distances from the first point cloud data is a first distance, the first point cloud data in the point cloud data being designated as a starting point; obtaining a vector angle by determining an angle between a first vector and a second vector, wherein the first vector may be composed of the first point cloud data and the second point cloud data, and the second vector may be composed of the first point cloud data and the third point cloud data; obtaining a set of vector angles by traversing the point cloud data; determining a first set of endpoints and a second set of endpoints based on the set of vector angles; and determining a set of center points based on the first set of endpoints and the second set of endpoints, wherein the set of center points may belong to the set of endpoints.

In some embodiments, the determining a first set of endpoints and a second set of endpoints based on the set of vector angles may include obtaining a subset of vector angles, in the set of vector angles, whose tangent values are greater than a first threshold; obtaining a first candidate set of endpoints by determining point cloud data, in point cloud data corresponding to the subset of vector angles, whose intervals meet a distance threshold condition; obtaining a second candidate set of endpoints by determining point cloud data, in the first candidate set of endpoints, corresponding to vector angles whose height differences are less than a second threshold; and determining the first set of endpoints and the second set of endpoints included in the second candidate set of endpoints based on direction information of the vector angles corresponding to the point cloud data in the second candidate set of endpoints.

In some embodiments, the method may further include determining whether coordinates of endpoints in the set of endpoints are continuous in the motion direction; in response to a determination the coordinates of endpoints in the set of endpoints are not continuous in the motion direction, determining at least one turning point between two adjacent endpoints based on coordinates of the two adjacent endpoints that are not continuous in the set of endpoints, wherein the at least one turning point may be configured to determine the turning trajectory.

In some embodiments, the determining at least one turning point between two adjacent endpoints based on coordinates of the two adjacent endpoints that are not continuous in the set of endpoints includes: determining a distance between the coordinates of the two adjacent endpoints in the motion direction; determining a count of the at least one turning point based on a count of image frames corresponding to the distance; and determining coordinates of the at least one turning point based on the distance and the count of the at least one turning point.

In some embodiments, the determining a count of the at least one turning point based on a count of image frames corresponding to the distance may include determining a first frame identifier and a second frame identifier corresponding to the two adjacent endpoints, respectively; determining the count of image frames corresponding to the distance based on the first frame identifier and the second frame identifier; and determining that the count of the at least one turning point is equal to the count of image frames.

In some embodiments, the determining coordinates of the at least one turning point based on the distance and the count of the at least one turning point may include determining the at least one turning point corresponding to the count of the at least one turning point on a line segment composed of the two adjacent endpoints; wherein the at least one turning point may be located between the two adjacent endpoints, and the distance between two adjacent turning points among the at least one turning point in the motion direction may be equal.

In some embodiments, the method may further include controlling the at least one working head to move with direction change based on the at least one turning point.

In some embodiments, the controlling the at least one working head to move with direction change based on the at least one change point may further include determining a frame identifier corresponding to each of the at least one turning point; and controlling the at least one working head to move with direction change based on the at least one turning point when an encoder triggers the high-precision measuring device to scan the target region corresponding to the frame identifier.

Another aspect of the present disclosure may provide a system for motion control of at least one working head. The system may include an acquisition module configured to obtain a target region of a subject based on a scan of a high-precision measuring device; an information determination module configured to determine depth information corresponding to the target region based on the target region; and a trajectory determination module configured to determine a motion trajectory of the at least one working head based on the depth information.

In some embodiments, the system may further include a motion control module configured to control the at least one working head to move based on the motion trajectory of the at least one working head.

Another aspect of the present disclosure may provide an electronic device. The electronic device may include memory configured to store executable instructions; and a processor configured to perform a method of any one of embodiments of the present disclosure when executing executable instructions stored in the memory.

Another aspect of the present disclosure may provide a computer readable storage medium, storing executable instructions, when executed by a processor, being configured to perform a method of any one of embodiments of the present disclosure.

Another aspect of the present disclosure may provide a motion control device for at least one working head. The motion control device may include an operation platform; a high-precision measuring device arranged on the operation platform; at least one working head; and a control assembly configured to control a motion trajectory of the at least one working head based on scanning information of the high-precision measuring device.

In some embodiments, the high-precision measuring device may include a three-dimensional (3D) line laser measuring instrument, the 3D line laser measuring instrument being arranged at one or both ends of the operation platform along a width direction of the operation platform.

In some embodiments, the at least one working head may be arranged at one or both ends of the operation platform along the width direction of the operation platform.

In some embodiments, the at least one working head may include a first working head and a second working head, and the first working head and the second working head may be respectively arranged at the both ends of the operation platform along the width direction of the operation platform.

In some embodiments, a distance between the first working head and the second working head along the width direction of the operation platform is constant; and the high-precision measuring device is arranged at one end of the operation platform along the width direction of the operation platform.

In some embodiments, the first working head and the second working head may move independently along the width direction of the operation platform; and the high-precision measuring device may be arranged at the both ends of the operation platform along the width direction of the operation platform.

In some embodiments, the motion control device may further include an encoder for detecting position information of a subject.

In some embodiments, the encoder may be arranged at the operation platform, a support for supporting the subject, or a driving motor of the at least one working head.

In some embodiments, the motion control device may further include a limit plate arranged on the operation platform, and the limit plate is configured to limit a position of the subject.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

FIG. 4 is another flowchart illustrating an exemplary method for motion control of at least one working head according to some embodiments of the present disclosure;

FIG. 7 is a flowchart illustrating an exemplary process for determining a first set of endpoints and a second set of endpoints included in target region according to some embodiments of the present disclosure;

FIG. 8 is flowchart illustrating another exemplary process for determining a first set of endpoints and a second set of endpoints included in target region according to some embodiments of the present disclosure;

FIG. 10 is a flowchart illustrating an exemplary process for determining at least one turning point according to some embodiments of the present disclosure;

FIG. 12 is flowchart illustrating another exemplary process for determining at least one turning point according to some embodiments of the present disclosure;

DETAILED DESCRIPTION

Figure 1:
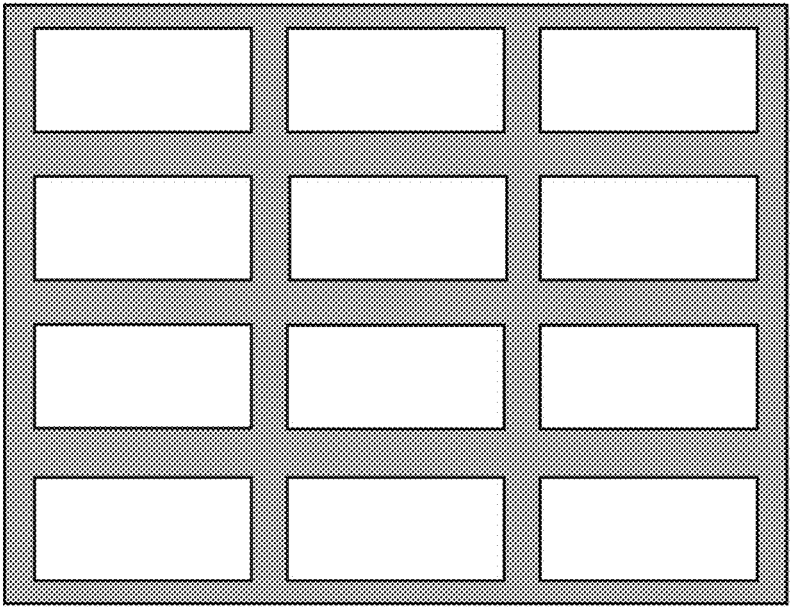
FIG. 1 is a diagram illustrating an exemplary three-dimensional (3D) wall sticker according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

One or more embodiments in the present disclosure provide a method and a system for motion control of at least one working head. In some embodiments, the system for motion control of the at least one working head may obtain a target region of a subject by using a high-precision measuring device, and determine depth information corresponding to the target region based on the target region, thus a motion trajectory of the at least one working head may be determined based on the depth information of the target region. The target region may refer to a region in the subject that needs to be processed (e.g., a cutting region, a dispensing region, a welding region, etc.). The depth information may include location information of the target region, such as point cloud data information, or coordinate information of a location point. Furthermore, the system for motion control of the at least one working head may also control the working head to move based on the motion trajectory of the working head, to implement corresponding operations. The system for motion control of the at least one working head provided in the embodiment of the present disclosure may be applied to such application scenarios as tool cutting, glue dispensing, manipulator welding, etc. For example, the working head may include a tool (e.g., a cutter), which may move based on a predetermined motion trajectory and cut the subject during the motion. As another example, the working head may cooperate with a glue joint or a welding tool. When the working head moves based on the predetermined motion trajectory, the glue joint or the welding tool also moves synchronously, and the subject may be dispensed or welded during the motion.

The system for motion control of the at least one working head is illustrated by taking an example that the working head is a tool, the subject is a wall sticker in a scenario with the tool cutting the wall sticker. FIG. 1 is a diagram illustrating an exemplary three-dimensional (3D) wall sticker according to some embodiments of the present disclosure. In some embodiments, the wall sticker may play an increasingly important role in home decoration. The 3D wall sticker may be made of chemical crosslinking of polyethylene (XPE), which has functions of heat preservation, moisture resistance and anti-collision. Further, 3D lines on the surface of the wall sticker may also enhance the aesthetics of the wall sticker. The application diagram of the 3D wall sticker is shown in FIG. 1. Generally, the 3D wall sticker produced by a factory often has wide and uneven rough edges. Before sales, those wide and uneven rough edges need to be cut and remove manually or automatically by a cutting device. Thus, when cutting those edges, a smooth turning path of the tool for cutting, and a high precision without cutting patterns of the 3D wall sticker is required (e.g., the precision of cutting edges is required to be at least 0.5 mm).

In some embodiments, depth information of a plane point on a corresponding operation contour curve may be determined based on a parallax from discrete points on the corresponding operation contour curve (e.g., a cutting contour curve in the cutting scene, a dispensing contour curve in the dispensing scene, or a welding contour curve in the welding scene) to images taken by a left camera and a right camera. Then 3D coordinates of feature points in the corresponding operation contour curve in the operation coordinate system may be determined. The at least one working head may implement corresponding operations (such as cutting, dispensing, or welding) based on the guidance of the 3D coordinates.

In some embodiments, 3D point cloud data of an operation region of the at least one working head may be obtained after determining parameters of a measuring device (e. g., a laser device). 3D reconstruction data may be obtained by tin difference, denoising, or edge smoothing, and the depth, area, and volume indexes of the operation region may be determined.

In some embodiments, in order to further reduce the complexity of the method for motion control of the at least one working head and improve the operation accuracy during working of the at least one working head, the embodiments of the present disclosure may provide a method, a system, and a device for motion control of the at least one working head to determine a motion trajectory of the operation, thus the subject may be processed efficiently and accurately. The detailed description may refer to FIGS. 2-18 and related descriptions.

Figure 2:
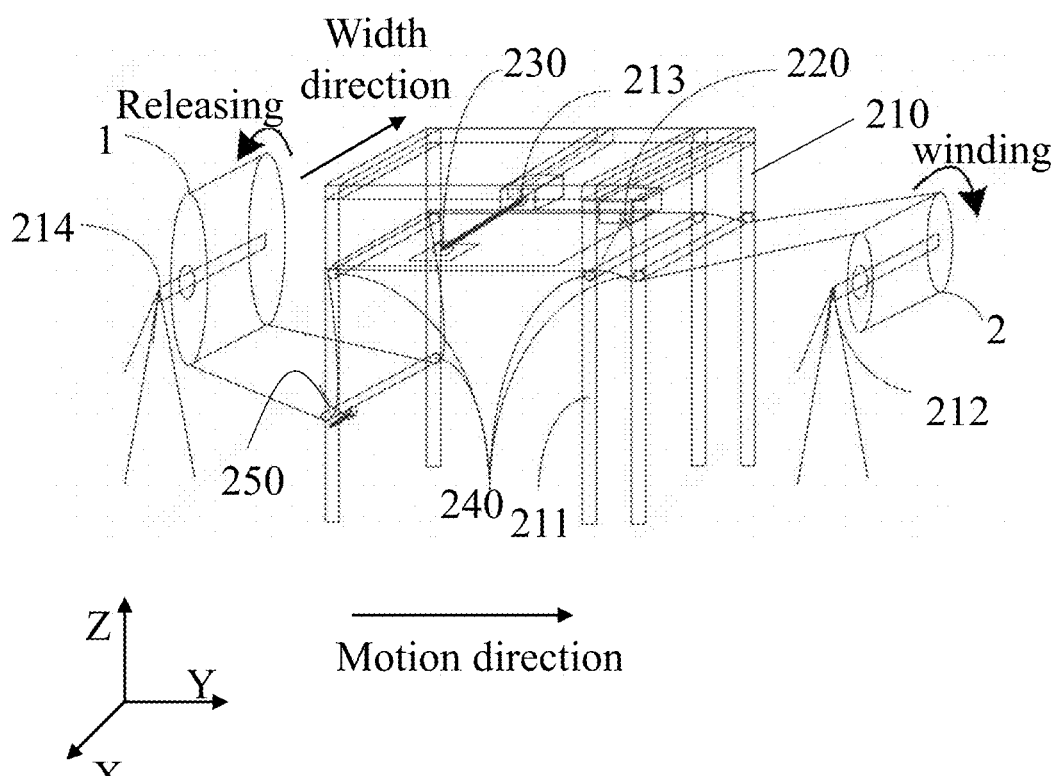
FIG. 2 is a device diagram illustrating an exemplary system for motion control of at least one working head according to some embodiments of the present disclosure.

FIG. 2 is a device diagram illustrating an exemplary system for motion control of at least one working head according to some embodiments of the present disclosure. As shown in FIG. 2, the device for motion control 200 of the at least one working head may include an operation platform 210, a high-precision measuring device 220, at least one working head 230, and a control assembly. The high-precision measuring device 220 may be arranged on the operation platform 210, and the high-precision measuring device 220 may scan a subject (e. g., a wall sticker 1) to obtain scanning information. The control assembly may be configured to control the motion trajectory of the at least one working head 230 based on the scanning information of the high-precision measuring device 220.

In some embodiments, the operation platform 210 may include a support 211 for supporting the operation platform 210. In some embodiments, other structures and/or devices may be provided on the operation platform 210, for example, different types of servo motors. A servo motor may control the at least one working head 230 to move under the action of the control assembly to complete different operations. In some embodiments, different devices may be arranged on the operation platform 210 to implement different functions based on different application scenarios of the system for motion control of the at least one working head. Taking the application of the system for motion control of the at least one working head to cutting wall stickers as an example, the operation platform 210 may include a servo motor controller, a servo motor 212 for winding wall sticker, a servo motor 213 for moving the at least one working head, a servo motor for cutting, a winding support 214, and a pressing plate. 1 refers to a wall sticker, and 2 refers to a wall sticker that has been cut. The pressing plate may be configured to press a running 3D wall sticker, to ensure that the wall sticker may not be separated from a field of vision of the high-precision measuring device 220 due to up and down fluctuations, thus the operation stability may be improved. A process of cutting wall stickers by the at least one working head 230 may be as follows: the control assembly controls the wall stickers on the winding support 214 to move forward (i.e., along a motion direction) by the servo motor 212 for winding wall sticker, and controls a cutting position of the at least one working head 230 by the servo motor 213 for moving the at least one working head. Then, the at least one working head 230 may be controlled to rotate by the servo motor for cutting of the at least one working head to cut the wall sticker. In some embodiments, the operation platform 210 may be a cabinet operation platform, and the cabinet operation platform may be placed on the ground to improve the dynamic reliability of the device for motion control 200.

In some embodiments, the high-precision measuring device 220 may be provided at one or both ends of the operation platform 210 along a width direction of the operation platform 210. The high-precision measuring device 220 may scan a subject to obtain scanning information. In some embodiments, the high-precision measuring device 220 may include a 3D line laser measuring instrument, and laser lines generated by the 3D line laser measuring instrument may irradiate on the running 3D wall sticker to obtain the scanning information. In some embodiments, the laser lines generated by the 3D line laser measuring instrument may be blue light. Because the blue light has strong resistance to ambient light, there may be no need for additional optical environment compensation such as light compensation, or shading. Thus, the reliability of the at least one working head may be improved. In other embodiments, the laser lines generated by the 3D line laser measuring instrument may be light of other colors, such as red light. In some embodiments, the high-precision measuring device 220 may include other devices capable of measuring, such as structured light, speckle, area array camera, or the like. In some embodiments, a count of high-precision measuring devices may be one or more. For example, when the sizes of regions on both sides of the subject along the width direction of the operation platform 210 (e.g., a rough edge of the wall sticker) are the same, the count of the high-precision measuring devices may be one. At this time, the high-precision measuring device 220 may be arranged at one end of the operation platform 210 along the width direction. As another example, when the sizes of the regions on both sides of the subject along the width direction of the operation platform 210 are different, the count of the high-precision measuring devices may be two. At this time, two high-precision measuring devices may be arranged at both ends of the operation platform 210 along the width direction, and the regions on both sides of the subject along the width direction of the operation platform 210 may be scanned respectively. In some embodiments, the system for motion control of the at least one working head may determine a motion trajectory of the at least one working head 230 based on the scanning information of the high-precision measuring device 220.

In some embodiments, the at least one working head 230 may perform operations on the subject based on the motion trajectory. For example, operations such as cutting, dispensing, welding, etc., may be performed on the subject. In some embodiments, a count of the at least one working head 230 may be one or more, and the one or more working heads may be arranged at one or both ends of the operation platform 210 along the width direction. In some embodiments, when only one side of the subject along the width direction of the operation platform 210 is required to process, the count of the at least one working head 230 may be one, and the one working head may be arranged at one end of the operation platform 210 along the width direction. In some embodiments, when both sides of the subject along the width direction of the operation platform 210 are required to process, the count of the at least one working head 230 may be two. The two working heads may include a first working head and a second working head, which may be respectively arranged at both ends of the operation platform 210 along the width direction. In some embodiments, a distance between the first working head and the second working head along the width direction of the operation platform 210 may be constant. For example, when the sizes of regions on both sides of the subject along the width direction of the operation platform 210 are the same, the motion trajectories of the first working head and the second working head may be the same, and the first working head and the second working head may move synchronously based on the same motion trajectory. In this case, the motion trajectory of the first working head and the second joint may be obtained based on the scanning information of the high-precision measuring device 220, and the high-precision measuring device 220 may be arranged at one end of the operation platform 210 along the width direction. In some embodiments, the first working head and the second joint may also move independently along the width direction of the operation platform 210. For example, when the sizes of the regions on both sides of the subject along the width direction of the operation platform 210 are different, the motion trajectory of the first working head (also known as the first motion trajectory) and the motion trajectory of the second working head (also known as the second motion trajectory) may be different, and the first working head and the second working head may move independently. That is, the first working head may move based on the first motion trajectory, and the second working head may move based on the second motion trajectory. In this case, two high-precision measuring devices may be arranged at both ends of the operation platform 210 along the width direction, and the two high-precision measuring devices may correspond to the first working head and the second working head, respectively. The first motion trajectory of the first working head may be obtained based on the scanning information of the high-precision measuring device corresponding to the first working head, and the second motion trajectory of the second working head may be obtained based on the scanning information of another high-precision measuring device corresponding to the second working head.

In some embodiments, the control assembly may be configured to control the motion trajectory of the at least one working head 230 based on the scanning information of the high-precision measuring device 220. In some embodiments, the control assembly may synchronously control the motion trajectories of the two working heads based on the scanning information of the high-precision measuring device 220, and the distance between the two working heads along the width direction of the operation platform 210 may be constant. In some embodiments, the control assembly may control the first motion trajectory of the first working head and the second motion trajectory of the second working head, respectively based on the scanning information of the two high-precision measuring devices. In some embodiments, the control assembly may include an industrial computer.

In some embodiments, the device for motion control 200 may also include a limit plate 240 arranged on the operation platform 210 to limit the position of the subject. For example, when the system for motion control of the at least one working head is applied to the cutting tool to cut the wall sticker, the limit plate 240 may limit the position of the wall sticker on the operation platform 210 to ensure that when the wall sticker moves forward driven by the servo motor 212 for winding wall sticker, the wall sticker may not be separated from the field of view of the high-precision measuring device 220 due to left-right offset, to ensure that a cutting region (e.g., a groove region) of the edge of the 3D wall sticker is located in the field of view of the high-precision measuring device 220.

In some embodiments, the device for motion control 200 may also include an encoder 250 for detecting the position information of the subject. The high-precision measuring device 220 may determine depth information corresponding to a target region based on the position information detected by the encoder 250. The depth information may be configured to determine the motion trajectory of the at least one working head 230. In some embodiments, the encoder 250 may send a trigger signal by marking a count of revolutions of a rotating component of the encoder 250 (e.g., a roller), and the trigger signal may be transmitted to the high-precision measuring device 220 through the control assembly to trigger the high-precision measuring device 220 to obtain an image of the subject. In some embodiments, the rotating component of the encoder 250 may be a anti-skid roller. In some embodiments, the encoder 250 may be arranged on the operation platform 210, a support for supporting the subject (i.e., a winding support 214), a driving motor (e.g., a servo motor for cutting of the at least one working head 230) of the at least one working head 230, or the like. In some embodiments, the rotating component (e.g., the anti-skid roller) of the encoder 250 may be pressed on the subject. When the subject moves forward driven by the servo motor 212 for winding wall sticker, the anti-skid roller may follow to rotate, thus the trigger signal may be transmitted at a specific interval. In some embodiments, a rotation axis of the rotating component (e.g., the anti-skid roller) of the encoder 250 may be arranged perpendicular to the motion direction of the subject. Thus, when the subject moves along the motion direction, the rotating component may rotate around the rotation axis.

It should be noted that the device for motion control 200 for the at least one working head is merely for illustration, and does not limit the scope of application of the present disclosure. For those skilled in the art, various modifications and changes may be made to the device for motion control 200 under the guidance of the present disclosure. For example, when the system for motion control of the at least one working head is applied to different scenes, the structure components on the operation platform 210 may be added, deleted, or replaced to implement different functions. However, these modifications and changes are still within the scope of the present disclosure.

The method for motion control of the at least one working head provided by the embodiments of the present disclosure may be described below in combination with the device for motion control 200 of the at least one working head shown in FIG. 2.

In some embodiments, the high-precision measuring device 220 and the at least one working head 230 may be calibrated before performing operations using the device for motion control 200 shown in FIG. 2. A process of calibration may also be referred to as performing a mapping between a camera coordinate system corresponding to the high-precision measuring device 220 and an working head coordinate system corresponding to the at least one working head 230. Specifically, the high-precision measuring device 220 may obtain point cloud data of a 3D subject in the camera coordinate system by scanning the 3D subject. The at least one working head 230 may need to change a position (i.e., change the direction of the at least one working head) when performing a specific operation (e.g., cutting burrs with different widths). The at least one working head 230 may merely identify coordinate information (or position information) in the working head coordinate system, so it is necessary to calibrate the high-precision measuring device 220 and the at least one working head 230. In some embodiments, a position of an origin and a positive direction of the at least one working head 230 may be determined first. The position of the origin of the at least one working head 230 may be referred to as an initial position of the at least one working head 230, and the position of the origin may be a center of a total range when changing the position. When an opposite direction of the motion direction of the subject (left side of the motion direction in FIG. 2) as the positive direction when changing the position, and when the at least one working head turn to the left, values of coordinates of at least one turning point on the X-axis may become larger.

Then, the position of the high-precision measuring device 220 may be determined. Specifically, as shown in FIG. 2, the high-precision measuring device 220 may be placed directly in front of the initial position of the at least one working head 230 along the motion direction, and a distance between a laser line generated by the high-precision measuring device 220 and an operation point of the at least one working head 230 may also be determined. The distance may be flexibly adjusted based on the actual installation scene, such as 300 millimeters. Finally, the camera coordinate system may be mapped to the working head coordinate system. Specifically, since the high-precision measuring device 220 is placed directly in front of the initial position of the at least one working head 230, 3D coordinates of a center point of a field of vision of the high-precision measuring device 220 after conversing coordinates may correspond to coordinates of an origin of the at least one working head 230. In actual operation, values of coordinates in the X-axis may be changed by controlling the at least one working head 230 to move to left or right (i.e., move along the width direction of the operating platform 210). Therefore, after determining the X-axis coordinates of the at least one turning point, the X-axis coordinates of the operation point of the at least one working head may be determined by subtracting a fixed value from the X-axis coordinates of the at least one turning point. The fixed value may be a value of coordinates of the center point of the field of view of the high-precision measuring device 220 in the X-axis direction. On the one hand, motion of the at least one working head may be completed automatically based on the motion trajectory without manual operation by using the device for motion control 200 shown in FIG. 2, thereby improving the work efficiency compared with manual operation. On the other hand, the subject may be processed accurately by controlling the at least one working head to move based on the motion trajectory.

Figure 3:
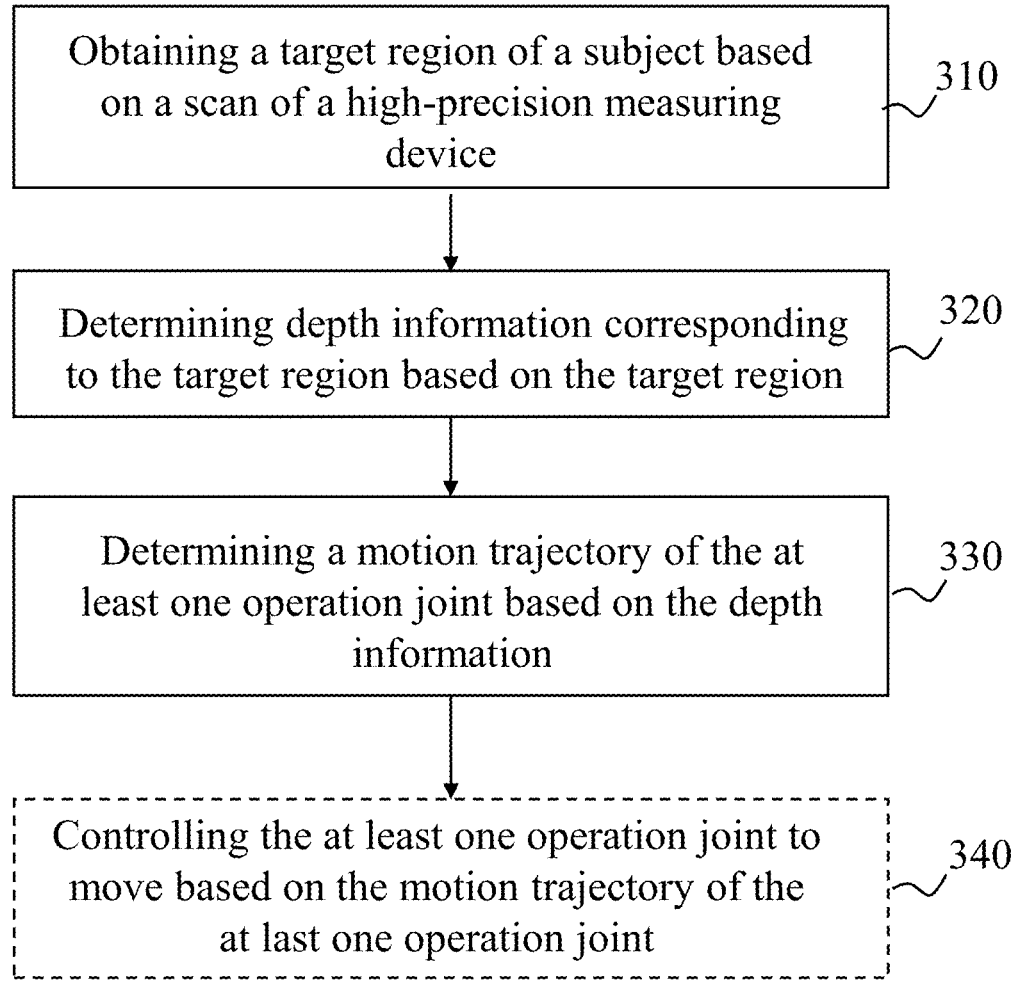
FIG. 3 is a flowchart illustrating an exemplary method for motion control of at least one working head according to some embodiments of the present disclosure.

FIG. 3 is a flowchart illustrating an exemplary process for motion control of at least one working head according to some embodiments of the present disclosure. As shown in FIG. 3, a process 300 may include operations 310 to 340.

In 310, a target region of a subject may be obtained. The target region may be obtained based on a scan of a high-precision measuring device.

In some embodiments, operation 310 may be performed by an acquisition module 1910 or the high-precision measuring device. The subject may be a subject to be processed with a specific operation by at least one working head. For example, the subject may include a wall sticker to be cut, a product to be welded, a product to be dispensed, or the like. The target region may refer to a region to be processed in the subject. For example, when the subject is a wall sticker, the target region may include a pattern region, a groove region, or a burr region of the wall sticker. The pattern region may be regarded as a reserved region of the wall sticker. The groove region may be regarded as a cutting region. The Burr region may be regarded as a removal region that needs to be removed from the wall sticker. In some embodiments, the high-precision measuring device, such as a 3D line laser measuring instrument, may generate a laser line, which may irradiate the subject, thereby obtaining the target region of the subject.

In 320, depth information corresponding to the target region may be determined based on the target region.

In some embodiments, the operation 320 may be performed by an information determination module 1920 or a processor. The depth information may refer to information of the target region along a depth direction of subject. In combination with the device for motion control 200 shown in FIG. 2, the depth direction of subject may be parallel to the width direction of the operation platform 210. In some embodiments, the depth information of the target region may include location information of the target region, such as point cloud data information and coordinate information. The coordinate information may be coordinate information in the camera coordinate system. Further, according to the above calibration method, the coordinate information in the working head coordinate system may be determined based on the coordinate information in the camera coordinate system, thus the motion trajectory of the at least one working head may be determined based on the coordinate information in the working head coordinate system.

In some embodiments, the depth information corresponding to different target regions may be determined based on different target regions. In some embodiments, the subject may include a plurality of target regions. For example, when the subject is a wall sticker, the wall sticker may be composed of a plurality of wall sticker units connected in turn. Each wall sticker unit may have a pattern region, a groove region, and a burr region. The information determination module may determine the depth information corresponding to a target region based on the target region. For example, based on each wall sticker unit, the depth information corresponding to the pattern region, the depth information corresponding to the groove region, and the depth information corresponding to the burr region of the corresponding wall sticker unit may be determined respectively.

In some embodiments, scanning information of the high-precision measuring device may be determined based on encoding information of the encoder, and the depth information corresponding to the target region may be determined based on the scanning information. In some embodiments, when the subject is moving, the rotating component of the encoder (e.g., a anti-skid roller) may move with the subject, thus the encoder may be driven to trigger the high-precision measuring device to scan (e.g., a plurality of single frame scanning) the subject, thus a plurality of images of the subject may be obtained. In some embodiments, the depth information corresponding to the target region, such as coordinate information of an endpoint, may be determined based on the plurality of images obtained by the high-precision measuring device. In some embodiments, when the encoder triggers the high-precision measuring device for scanning, the encoder may rotate one circle to trigger the high-precision measuring device for one or more scans. In some embodiments, the frame rate of the high-precision measuring device (e.g., a 3D line laser measuring instrument) may be 5000 frames per second, thereby meeting the operation requirements of a subject whose motion speed is 1.5 m/s.

The more information about determining the depth information corresponding to the target region may refer to FIGS. 4-8 of the present disclosure and their related descriptions.

In 330, a motion trajectory of the at least one working head may be determined based on the depth information.

In some embodiments, operation 330 may be performed by a trajectory determination module 1930 or a processor. The motion trajectory of the at least one working head may be a motion trajectory when the at least one working head is working. For example, when the at least one working head is cutting, the motion trajectory is a cutting trajectory of the at least one working head. In some embodiments, the motion trajectory may include a cutting trajectory, a dispensing trajectory, a welding trajectory, or the like.

In some embodiments, a motion region of the at least one working head may be determined based on the depth information corresponding to the target region. Then the motion trajectory of the at least one working head may be determined based on the motion region. The motion region of the at least one working head may be a region where the at least one working head is operated to move. In some embodiments, the motion region may include a cutting region (e.g., a groove region of a wall sticker), a dispensing region, a welding region, or the like. In some embodiments, the motion region in the target region of the subject may be a region that allows the at least one working head to operate, while other regions, that is, may be no-motion regions that do not allow the at least one working head to operate. For example, the pattern region in the target region of the wall sticker is not allowed to be operated by the at least one working head. The at least one working head needs to cut in the groove region to ensure the process requirements of the wall sticker. In some embodiments, the motion region of the at least one working head may be determined based on the coordinate information (e.g., the coordinate information of the endpoint) of each position point in the target region. For example, in the depth direction of the subject, the region formed by the point cluster whose coordinate values and/or coordinate differences meet a predetermined condition (e.g., a coordinate difference is within a predetermined range (e.g., 5 mm)) may be designated as the motion region of the at least one working head.

In some embodiments, a motion reference path of the at least one working head may be determined based on the motion region and the motion direction of the subject. The motion trajectory of the at least one working head may be determined based on the motion reference path. In some embodiments, the motion reference path may include a center line path of the motion region and a path parallel to the center line in the motion region. The path parallel to the center line in the motion region may be a motion trajectory determined based on the motion region. For example, the path parallel to the center line in the motion region may be a trisection line, a quadrant of the motion region, or a path with a predetermined distance from an edge of the motion region. In some embodiments, any path in the motion reference path of the at least one working head may be designated as the motion trajectory of the at least one working head.

In some embodiments, the motion region may include a plurality of sub-regions, and the determining the motion trajectory based on the motion region may include determining whether two adjacent sub-regions among the plurality of sub-regions are continuous in the motion direction; determining whether to add a turning trajectory based on a determination whether the two adjacent sub-regions among the plurality of sub-regions are continuous in the motion direction.

In some embodiments, the motion region may be a region formed by successively connecting the plurality of sub-regions along the motion direction. For example, in a field of the wall sticker, two adjacent sub-regions may refer to cutting regions (such as groove regions) of two adjacent wall stickers. Whether the two adjacent sub-regions are continuous in the motion direction may refer to whether two sides in the depth direction of each of the two adjacent sub-regions are aligned along the motion direction (i.e., whether there is dislocation). For example, in the field of the wall sticker, a wall sticker roll is formed by splicing a plurality of wall stickers in turn. If rough edge regions on the two adjacent wall stickers are not aligned, two adjacent groove regions corresponding to the two adjacent wall stickers may not be aligned. It could be understood in combination with the two adjacent wall stickers shown in FIG. 11, that is, the sticker pattern sheet 1 and the sticker pattern sheet 2. A sticker edge of the sticker pattern sheet 1 is not aligned with a sticker edge of the sticker pattern sheet 2. At this time, the groove regions corresponding to the two sticker edges are not aligned. In some embodiments, the determination whether the two adjacent sub-regions among the plurality of sub-regions are continuous in the motion direction may be determined based on the coordinate information of end-points of the adjacent edges in the two sub-regions. For example, when coordinate values of the endpoints of adjacent edges are continuous along the motion direction, the two adjacent sub-regions may be continuous in the motion direction. When the coordinate values of the endpoints of adjacent edges are not continuous along the motion direction, the two adjacent sub-regions may not be continuous in the motion direction.

The turning trajectory may refer to a trajectory in which a direction of the at least one working head is changed. In some embodiments, in order to ensure that the motion trajectory of the at least one working head is accurate and the subject may not be damaged, whether to add the turning trajectory may be determined based on a determination whether the two adjacent sub-regions are continuous in the motion direction.

In some embodiments, when the two adjacent sub-regions are continuous in the motion direction, there may be no deviation region between the two adjacent sub-regions, and the turning trajectory may not be added to the motion trajectory of the at least one working head.

In some embodiments, when the two adjacent sub-regions are not continuous in the motion direction, there may be a deviation region between the two adjacent sub regions. Thus, the turning trajectory may be added to a deviation region. The deviation region may refer to a dislocation region in a connecting zone between the two adjacent sub-regions. In some embodiments, at least one turning point may be determined between two adjacent endpoints based on coordinates of the two adjacent endpoints that are not continuous, thus the turning trajectory may be deter-mined based on the at least one turning point. For example, a distance of the deviation region in the motion direction (i.e., a distance of a projection of a line between the two adjacent endpoints located in the two adjacent sub regions respectively in the motion direction) may be determined, and a count of the at least one turning point may be determined based on a count of image frames corresponding to the distance, thus the coordinates of the at least one turning point may be determined based on the count of the at least one turning point and the distance of the deviation region in the motion direction. The more information for determining the at least one turning point and the turning trajectory may refer to FIG. 4, FIGS. 10-12 and their related descriptions.

In 340, the at least one working head may be controlled to move based on the motion trajectory of the at least one working head.

In some embodiments, the operation 340 may be per-formed by a motion control module 1940 or a control assembly. In some embodiments, after the motion trajectory of the at least one working head is determined, the at least one working head may be controlled to move to process the subject. For example, a cutting operation may be performed on the subject by the at least one working head based on a cutting trajectory of the at least one working head. As another example, a dispensing operation may be performed on the subject by the at least one working head based on a dispensing trajectory of the at least one working head. As still another example, a welding operation may be per-formed on the subject by the at least one working head base on a welding trajectory of the at least one working head.

In some embodiments, the at least one working head may include a first working head and a second working head, and a distance between the first working head and the second working head may be constant. At this time, based on the motion trajectory of the at least one working head, control-ling the at least one working head to move may include: controlling the first working head and the second working head to move based on the motion trajectory of the first working head. In some embodiments, when the sizes of motion regions on both sides of the depth direction of the subject are the same, the motion trajectories of the first working head and the second working head may be the same, and the first working head and the second working head may synchronously move based on the same motion trajectories to performing an operation on the subject.

In some embodiments, when the sizes of the motion regions on both sides of the depth direction of the subject are different, the first working head and the second working head may move based on different motion trajectories to perform operations with different trajectories on both sides of the depth direction of the subject. The motion trajectory of the at least one working head may include a first motion trajectory of the first working head and a second motion trajectory of the second working head. At this time, based on the motion trajectory of the at least one working head, controlling the at least one working head to move may include controlling the first working head to move based on the first motion trajectory, and controlling the second work-ing head to move based on the second motion trajectory. The first motion trajectory and the second motion trajectory may be determined based on scanning information of different high-precision measuring devices.

It should be noted that the above description of the process 300 is merely for illustration, and does not limit the scope of application of the present disclosure. For those skilled in the art, various modifications and changes may be made to process 300 under the guidance of the present disclosure. For example, operations 310 and 320 may be integrated into one operation. However, these modifications and changes are still within the scope of the present disclo-sure.

FIG. 4 is a flowchart illustrating an exemplary process for motion control of at least one working head according to some embodiments of the present disclosure. In some embodiments, as shown in FIG. 4, a process 400 may include operations 410 to 450.

In 410, point cloud data of the target region may be obtained based on the target region of a subject.

In some embodiments, operation 410 may be performed by the acquisition module 1910 or a high-precision measur-ing device. In some embodiments, the point cloud data of the target region may be obtained by scanning the target region of the subject by a high-precision measuring device (e.g., a 3D line laser measuring instrument). For example, the point cloud data may be point cloud data of an edge structure of the subject. The edge structure may be a structure to be processed in the subject (i.e., the edge structure is a position of a motion region of at least one working head). The edge structure may include a cutting structure, a dispensing structure, a welding structure, or the like. Taking a wall sticker as an example, the edge structure may be a groove region of the wall sticker. By trimming the groove region of an edge of a wall sticker, the edge of wall sticker may be smooth and neat.

Figure 5:
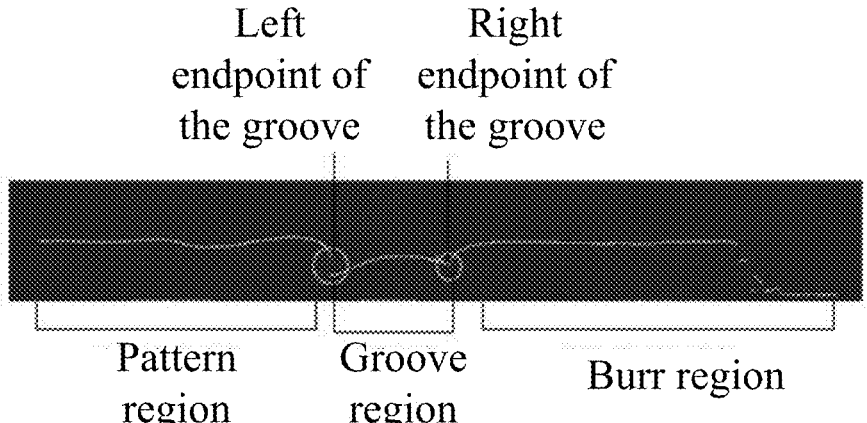
FIG. 5 is a schematic diagram illustrating an exemplary point cloud data of an image according to some embodiments of the present disclosure.

In some embodiments, the high-precision measuring device may scan the subject to obtain the point cloud data of a single frame image of the edge structure. The point cloud data of an image frame may be a portion of depth information of the edge structure. FIG. 5 is a schematic diagram illustrating exemplary point cloud data of an image according to some embodiments of the present disclosure. In some embodiments, taking a 3D wall sticker shown in FIG. 1 as an example, a laser line output by the 3D line laser measuring instrument is incident on the edge structure of the wall sticker, and as shown in FIG. 5, the point cloud data of the image frame may be obtained. The image frame shown in FIG. 5 may include a groove region composed of a left endpoint of the groove and a right endpoint of the groove. A cutting point for trimming the wall sticker may be a midpoint of the groove region, the left endpoint, the right endpoint of the groove region, or any point between the left endpoint and the right endpoint of the groove region.

In 420, a set of endpoints of the target region may be determined based on the point cloud data of the target region.

In some embodiments, operation 420 may be performed by the information determination module 1920 or a processor. In some embodiments, a straight line composed of the set of endpoints of the target region (e.g., an edge structure) may be used as an operation point for processing the edge structure of the subject. For example, the straight line formed by the set of endpoints of the edge structure may be used as cutting points for cutting the edge structure of the subject, dispensing points for dispensing, or welding points for welding. That is, the straight line formed by the set of endpoints of the edge structure may be determined as the motion trajectory of the at least one working head. In some embodiments, the set of endpoints of the edge structure may be a set of left endpoints of the edge structure, a set of right endpoints of the edge structure, or a set of any endpoints between the set of left endpoints and the set of right endpoints of the edge structure (e.g., a set of center points between the set of left endpoints and the set of right endpoints). Taking the wall sticker as an example, the edge structure may be a groove region of the wall sticker, and the set of center points of the edge structure may be a set composed of center points of the left endpoints of the groove and center points of the right endpoints of the groove.

Figure 6:
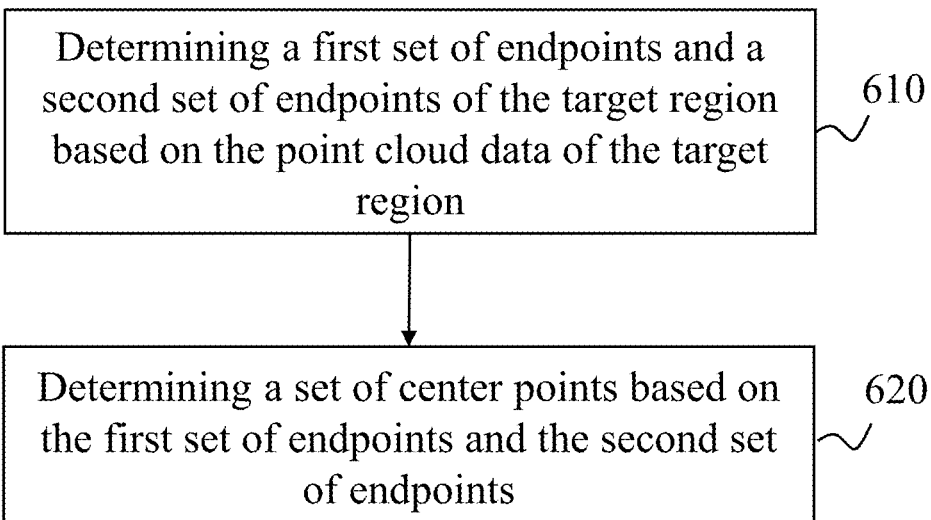
FIG. 6 is a flowchart illustrating an exemplary process for determining a set of center points of a target region according to some embodiments of the present disclosure.

In some embodiments, operation 420 may be performed according to process 600 as illustrated in FIG. 6. FIG. 6 shows a flowchart illustrating a process for determining the set of center points of the target region based on the point cloud data of the target region according to some embodiments of the present disclosure.

In 610, a first set of endpoints and a second set of endpoints of the target region may be determined based on the point cloud data of the target region. In some embodiments, a plurality of point cloud data in the point cloud data may be configured to construct vectors and a set of vector angles, the point cloud data in the set of vector angles may be filtered, fragments of the point cloud data may be deleted, and the first set of endpoints and the second set of endpoints may be determined. For example, certain point cloud data may be designated as a starting point, the certain point cloud data and another two point cloud data with the same distance from the certain point cloud data may form two vectors, and then the point cloud data may be traversed in a similar way to obtain the set of vector angles. The more information for determining the first set of endpoints and the second set of endpoints may refer to FIGS. 7-8 and their related descriptions.

In 620, a set of center points of the target region may be determined based on the first set of endpoints and the second set of endpoints.

Figure 9:
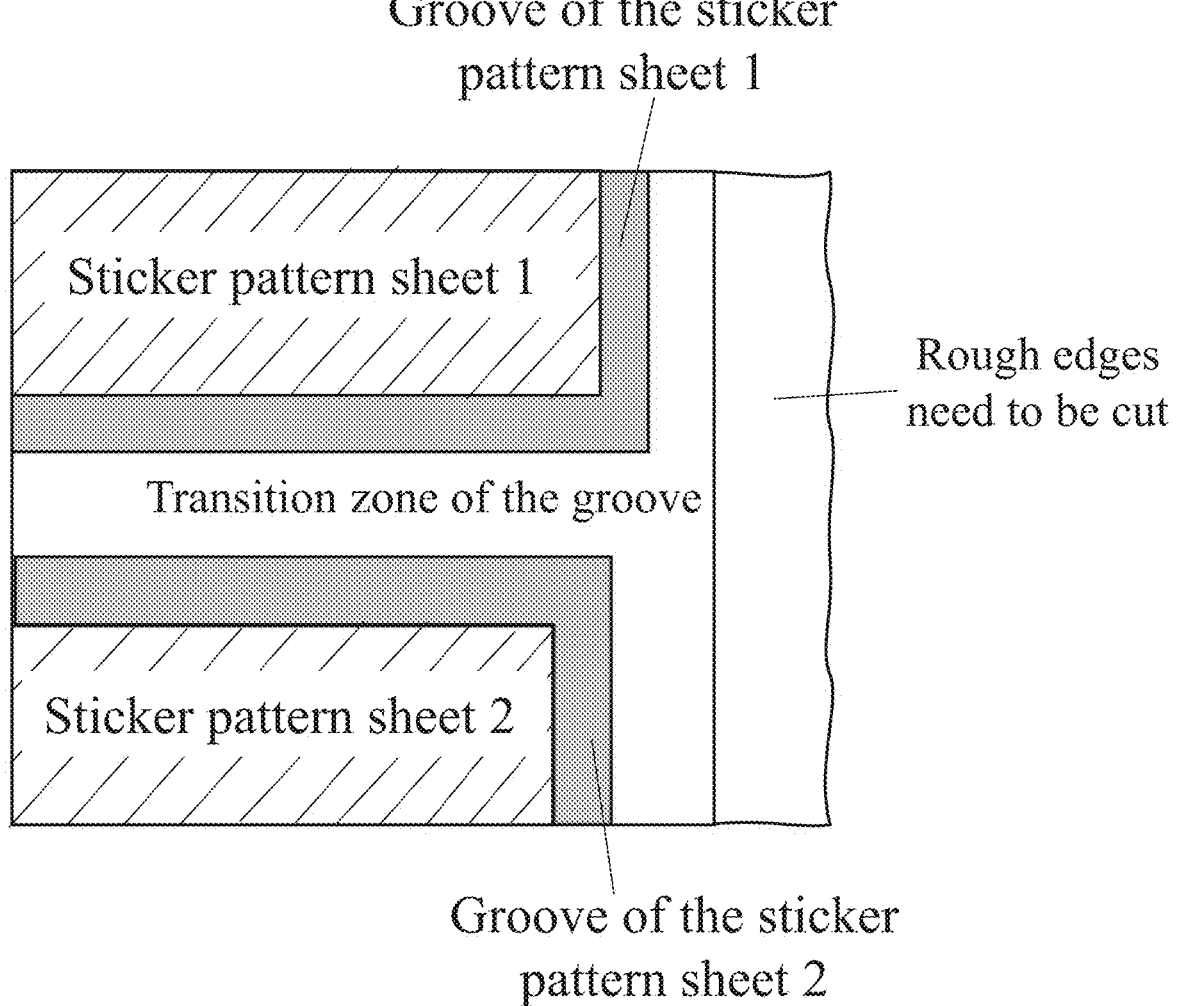
FIG. 9 is a schematic diagram illustrating two wall stickers including edge transition zones according to some embodiments of the present disclosure.

In some embodiments, a target region (e.g., the edge structure) of an independent subject may have continuity, and the edge structure at a connection of two subjects may not be continuous. In some embodiments, when the edge structure of an independent subject includes a plurality of sub-structures (i.e., the motion region described above may include a plurality of sub-regions), two adjacent sub-structures among the plurality of sub-structures may be continuous or may not be continuous. Taking two wall stickers as the two subjects and the edge structure as the groove as an example, the schematic diagram of two wall stickers including a transition zone is shown in FIG. 9. One wall sticker may be sticker pattern sheet 1, and another wall sticker connected with the sticker pattern sheet 1 may be sticker pattern sheet 2. The groove of the sticker pattern sheet 1 is continuous, and the groove of the sticker pattern sheet 2 is also continuous. A connection of the sticker pattern sheet 1 and the sticker pattern sheet 2 may be called a transition zone (also called a deviation zone), and the transition zone may not include the first set of endpoints and the second set of endpoints.

In some embodiments, the first set of endpoints and the second set of endpoints may be two sets of endpoints located at both ends of the edge structure and corresponding to each other. The set of center points may be obtained by counting midpoints of a line formed by the two corresponding endpoints in the first set of endpoints and the second set of endpoints. If the point cloud data in the set of center points is continuous, the set of center points may correspond to a subject (or a sub-structure). Alternatively, the set of center points may correspond to a plurality of subjects (or a plurality of sub-structures), and the edge structure at the connection of the plurality of the subjects may be continuous. If the point cloud data in the set of center points is not continuous, the set of center points may correspond to two or more subjects (or sub-structures).

In some embodiments, the first set of endpoints and the second set of endpoints may correspond to the point cloud data of the plurality of image frames. The first set of endpoints and the second set of endpoints may be sets of endpoints on both sides corresponding to a subject, or set of endpoints on both sides corresponding to two or more subjects. Specifically, the continuity of the point cloud data in the first set of endpoints and/or the continuity of the point cloud data in the second set of endpoints may be used to determine that the first set of endpoints and the second set of endpoints correspond to one or more subjects.

The point cloud data is continuous may refer to that coordinate values of the point cloud data on a coordinate axis in the 3D coordinate system are continuous. In some embodiments, continuous coordinate values may refer to that a difference between coordinate values of two adjacent point cloud data on one coordinate axis is less than a predetermined threshold. In some embodiments, a range of the predetermined threshold may be within 0.05 mm-0.1 mm.

In 430, whether coordinates of endpoints in the set of endpoints are continuous in the motion direction may be determined.

In some embodiments, operation 430 may be performed by the trajectory determination module 1930 or a processor.

In some embodiments, the motion direction may be a scanning direction of the high-precision measuring device or an opposite direction of the scanning direction. Whether the coordinates of endpoints in the set of endpoints are continuous in the motion direction may include whether coordinates of endpoints in the set of endpoints are continuous in the scanning direction and whether coordinates of endpoints in the set of endpoints are continuous in the opposite direction of the scanning direction. In this scenario, the coordinates of endpoints in the set of endpoints being not continuous in the motion direction may refer to that a distance between coordinates of two adjacent endpoints in the motion direction is greater than a distance between coordinates of any other two endpoints in the motion direction.

In other embodiments, the motion direction may be a direction perpendicular to the scanning direction of the high-precision measuring device. In this scenario, the coordinates of endpoints being not continuous in the motion direction may refer to that the coordinates of the two adjacent endpoints are different in the motion direction.

In 440, in response to a determination the coordinates of endpoints in the set of endpoints are not continuous in the motion direction, at least one turning point between two adjacent endpoints may be determined based on coordinates of the two adjacent endpoints that are not continuous in the set of endpoints.

In some embodiments, operation 440 may be performed by the trajectory determination module 1930 or a processor. The at least one turning point may be configured to determine a turning trajectory. In some embodiments, the at least one turning point may be determined based on coordinate information of the coordinates of the two adjacent endpoints in the motion direction. For example, first coordinate information and second coordinate information of the coordinates of the two adjacent endpoints in the motion direction may be determined, thus the distance of the coordinates of the two adjacent endpoints in the motion direction may be determined based on the first coordinate information and the second coordinate information. Further, a count of at least one turning point may be determined based on the count of image frames corresponding to the distance, and the coordinates of the at least one turning point may be determined. The more information for determining the at least one turning point may refer to FIG. 10-12 and their related descriptions.

In some embodiments, after the count of the at least one turning point and the coordinates of the at least one turning point are determined, the turning trajectory of the at least one working head may be determined based on the count of the at least one turning point and the coordinates of the at least one turning point.

In 450, the at least one working head may be controlled to move with direction change based on the at least one turning point.

In some embodiments, operation 450 may be performed by the motion control module 1940 or a control assembly. In some embodiments, the operation position of the at least one working head may be changed at the turning point to perform operations on the transition zone.

In some embodiments, at least one frame identifier corresponding to the at least one turning point may be determined, and the at least one working head may be controlled to perform operations at the at least one turning point when the high-precision measuring device acquires an image corresponding to the at least one frame identifier. In this way, the at least one working head may move with direction change smoothly at the transition zone, the smooth transition of the at least one working head may be realized, and no sharp edges during operation may be ensured.

For example, if the anti-skid roller of the encoder rotates for one circle with a length is P, and Q pulses are generated between two adjacent image frames, a step length of the encoder may be P/Q. A horizontal distance S between two turning points may be obtained by multiplying a difference between two frame identifiers corresponding to the two turning points by the step length of the encoder. After the at least one working head completes an operation at one turning point, the control assembly (e.g., an industrial computer) may control a servo motor for moving the at least one working head to drive the at least one working head move in the horizontal direction with a distance S, thus the operation at an adjacent turning point may be performed. Specifically, the industrial computer may control the coordinates of the at least one turning point and an encoder identifier (ID) of the at least one turning point. By controlling the encoder ID of the at least one turning point, which transition center point should be processed may be determined, and by controlling the coordinates of the at least one turning point, an operation position may be determined.

In some embodiments, the high-precision measuring device may be arranged directly in front of the at least one working head to identify a nearest turning point. When the subject moves to the at least one working head, the industrial computer may transmit coordinate information of the nearest turning point to a servo motor controller, the servo motor controller may control the servo motor for moving the at least one working head to move towards left or right. However, since edge structures of a plurality of subjects may be uneven, if the servo motor for moving the at least one working head is not moved towards left or right at the at least one turning point in time, the operation position error or unsmooth operation may occur. Taking the wall sticker as an example, with the wall sticker being rolled up continuously, the wall sticker on a winding support may become thicker and thicker, a linear velocity of the wall sticker may increase nonlinearly, and the running distance of the wall sticker calculated by the linear velocity may not be accurate. Therefore, the running distance of the wall sticker may be determined based on the encoder ID in the embodiment of the present disclosure. The anti-skid roller of the encoder rotates for one circle with a length is P, and an initial encoder ID is known. A value obtained by subtracting the initial encoder ID from a current encoder ID may be multiplied by the length P to obtain a result, and then the result may be added to a horizontal distance between the high-precision measuring device and the at least one working head, the running distance of the wall sticker may be accurately determined.

It should be noted that the above description of the process 400 is merely for illustration, and does not limit the scope of application of the present disclosure. For those skilled in the art, various modifications and changes may be made to the process 400 under the guidance of the present disclosure. For example, the operations 430 and 440 may be combined into one operation. However, these modifications and changes are still within the scope of the present disclosure.

FIG. 7 is a flowchart illustrating an exemplary process for determining a first set of endpoints and a second set of endpoints included in a target region according to some embodiments of the present disclosure. In some embodiments, operation 610 may be performed according to process 700 in FIG. 7.

In 710, second point cloud data and third point cloud data whose distances from first point cloud data are first distances may be determined. The first point cloud data in the point cloud data may be designated as a starting point.

In some embodiments, the first point cloud data may be point data in any position in the point cloud data. In some embodiments, the first point cloud data may be randomly determined. In some embodiments, a depth of the edge structure along the depth direction may be determined from the point cloud data. In some embodiments, the first distance may be equal to a half of the depth of the edge structure.

In some embodiments, the first point cloud data, the second point cloud data, and the third point cloud data may be point cloud data corresponding to the same image frame. The second point cloud data and the third point cloud data may be located at the front and back sides of the first point cloud data, respectively.

In 720, a vector angle may be obtained by determining an angle between a first vector and a second vector. The first vector may be composed of the first point cloud data and the second point cloud data, and the second vector may be composed of the first point cloud data and the third point cloud data.

In some embodiments, a cross multiplication may be performed on the first vector and the second vector, and a result of the cross multiplication may be the vector angle between the first vector and the second vector.

In 730, a set of vector angles may be obtained by traversing the point cloud data.

In some embodiments, for each image frame collected by the high-precision measuring device, all the point cloud data in the image frame may be traversed, an angle between a vector formed by a point cloud data and a point cloud data before the point cloud data and another vector formed by the point cloud data and a point cloud data after the point cloud data may be determined, thus the set of vector angles may be obtained.

For example, after operations 710 and 720, the third point cloud data in the point cloud data may be designated as a starting point, the first point cloud data and fourth point cloud data whose distances from the third point cloud data are first distances may be determined. A vector formed by the first point cloud data and the third point cloud data may cross multiply with a vector formed by the third point cloud data and the fourth point cloud data, thus a vector angle may be obtained. By analogy, the set of vector angles of an image frame may be obtained.

In 740, a first set of endpoints and a second set of endpoints may be determined based on the set of vector angles.

In some embodiments, the set of vector angles may be filtered. For example, fragments of the point cloud data may be filtered based on a determination whether vertices corresponding to vector angles of the set of vector angles are continuous. If a vertex corresponding to a vector angle of the set of vector angles is not continuous with other vertices corresponding to other vector angles of the set of vector angles based on coordinates of the vertex corresponding to the vector angle and coordinates of the other vertices corresponding to the other vector angles, the vertex may be a fragment of the point cloud data, and point cloud data corresponding to the vector formed of the vertex may be deleted. By the same manner, a continuous region (e.g., whether two adjacent sub-regions are continuous) in the image frame may be determined. In some embodiments, the vector angles and/or the point cloud data corresponding to vectors in the set of vector angles may be filtered to determine the first set of endpoints and the second set of endpoints. For example, tangent values of the vector angles in the set of vector angles may be filtered to obtain a subset of vector angles that meet an angle condition. As another example, point cloud data corresponding to the subset of vector angles may be filtered to obtain a candidate set of endpoints that meets a distance condition. The detailed description for determining the first set of endpoints and the second set of endpoints based on the set of vector angles may refer to FIG. 8 and its related description.

It should be noted that the above description of the sub-operations of the operation 610 is merely for illustration, and does not limit the scope of application of the present disclosure. For those skilled in the art, various modifications and changes may be made to the operation 610 under the guidance of the present disclosure. However, these modifications and changes are still within the scope of the present disclosure.

FIG. 8 is a flowchart illustrating another exemplary process for determining a first set of endpoints and a second set of endpoints included in a target region according to some embodiments of the present disclosure. Operation 740 may be performed according to process 800 as illustrated in FIG. 8.

In 810, a subset of vector angles, in the set of vector angles, whose tangent values are greater than a first threshold may be obtained.

In some embodiments, the set of vector angles may be filtered based on angles. Taking an edge structure being a groove as an example, a vector angle at a bottom endpoint of the groove is greater than 90° and close to 90°, that is, a sine value of the vector angle at the bottom endpoint of the groove is close to 1, and a tangent value is close to infinity. Vector angles in the set of vector angles whose tangent values are greater than the first threshold may compose a subset of vector angles. By setting an appropriate first threshold, vector angles composed of some point cloud data being not at the groove bottom endpoint may be filtered out. In some embodiments, a range of the first threshold may be 0.5-1. For example, the range of the first threshold may be within 0.5-0.8.

In 820, a first candidate set of endpoints may be obtained by determining point cloud data, in point cloud data corresponding to the subset of vector angles, whose intervals meet a distance threshold condition.

In some embodiments, an edge structure may have a certain depth range. Taking a groove whose edge structure is a wall sticker as an example, a depth range of the groove is usually 3 mm to 5 mm. Therefore, a distance between bottom endpoints of the groove may be approximately 3 mm to 5 mm, and the distance threshold condition may be the depth range of the groove.

In some embodiments, the intervals of the point cloud data may be obtained by calculating intervals between the point cloud data corresponding to the subset of vector angles. The point cloud data, whose intervals satisfies the distance threshold condition may be composed of the first candidate set of endpoints, and data in the first candidate set of endpoints may be the bottom endpoints on both sides of the groove.

In 830, a second candidate set of endpoints may be obtained by determining point cloud data, in the first candidate set of endpoints, corresponding to vector angles whose height differences are less than a second threshold.

In some embodiments, taking an edge structure being a groove as an example, a bottom of the groove is horizontal, two bottom corners of the groove are located on the same horizontal line, and a height difference between the two bottom corners of the groove is zero or close to zero. Therefore, the point cloud data corresponding to the first candidate set of endpoints may be filtered by comparing a height difference between two vector angles. If the height difference between the two vector angles is less than the second threshold, the two vector angles may be the bottom angle of the groove, and the point cloud data corresponding to the vector angles whose height differences are less than the second threshold may compose the second candidate set of endpoints. In some embodiments, the second threshold may be flexibly set based on the actual application. For example, a range of the second threshold may be within 0.1-0.5 mm. For example, the second threshold may be set as 0.1 mm, 0.2 mm, or the like.

In 840, the first set of endpoints and the second set of endpoints included in the second candidate set of endpoints may be determined based on direction information of the vector angles corresponding to the point cloud data in the second candidate set of endpoints.

In some embodiments, the point cloud data in the second candidate set of endpoints may be classified based on the direction information of the vector angles corresponding to the point cloud data in the second candidate set of endpoints, and the point cloud data corresponding to the vector angles with the same direction may be divided into a set of endpoints to obtain the first set of endpoints and the second set of endpoints. The point cloud data in the first set of endpoints and the point cloud data in the second set of endpoints may respectively correspond to bottom endpoints on both sides of the groove. The direction information of the vector angles may refer to geometric feature information of the vector angles. For example, The direction information may be a direction from a top of the groove to a bottom of the groove, or a direction from the bottom of the groove to the top of the groove.

In some embodiments, 3D coordinate values of point cloud data in any set of endpoints corresponding to an independent subject may be unchanged in two dimensions. For example, the coordinate values of the point cloud data in a set of left endpoints of the groove in the Z-axis direction and Y-axis direction may remain unchanged, and the coordinate values of the point cloud data in a set of left endpoints of the groove in the X-axis direction may change continuously. The coordinate values of the point cloud data in the set of right endpoints of the groove in the Z-axis direction and Y-axis direction may be unchanged, and the coordinate values of the point cloud data in the set of right endpoints of the groove in the X-axis direction may be continuously changed. The coordinate values of the left endpoints and the right endpoints of the groove in the Y-axis direction may be different. Therefore, based on the continuity of the 3D coordinates corresponding to the point cloud data, the first set of endpoints and the second set of endpoints may also be identified. If coordinate values of two point cloud data in X-axis direction and Y-axis direction are different, the two point cloud data may belong to two different sets of endpoints.

In some embodiments, the point cloud data corresponding to a image frame may be classified into the first set of endpoints and the second set of endpoints based on the direction information of direction vectors including the point cloud data. First sets of endpoints corresponding to a plurality of image frames may also be fused into a first set of endpoints base on the direction information of the direction vectors including the point cloud data, and second sets of endpoints corresponding to the plurality of image frames may be fused into a second set of endpoints.

In some embodiments, the point cloud data corresponding to an image frame may also be classified into a first set of endpoints and a second set of endpoints based on the direction information of the direction vectors including the point cloud data. Then, the first sets of endpoints corresponding to the plurality of image frames may be clustered into a first set of endpoints by clustering, and the second sets of endpoints corresponding to the plurality of image frames may be clustered into a second set of endpoints. In the process of clustering, redundant point cloud data included in the first set of endpoints and the second set of endpoints corresponding to each image frame may be excluded. Taking the wall sticker as an example, the redundant point cloud data may be point cloud data corresponding to rough edges of an edge of the wall sticker.

It should be noted that the above description of the operation 740 is merely for illustration, and does not limit the scope of application of the present disclosure. For those skilled in the art, various modifications and changes may be made to the operation 740 under the guidance of the present disclosure. For example, the operation 840 may be omitted and the first candidate set of endpoints and the second candidate set of endpoints may be regarded as a first set of endpoints and a second set of endpoints. However, these modifications and changes are still within the scope of the present disclosure.

FIG. 10 is a flowchart illustrating an exemplary process for determining at least one turning point according to some embodiments of the present disclosure. In some embodiments, operation 440 in FIG. 4 may be performed according to process 1000 as illustrated in FIG. 10.

In 1010, first coordinate information and second coordinate information of the coordinates of two adjacent endpoints in the motion direction may be determined.

Figure 11:
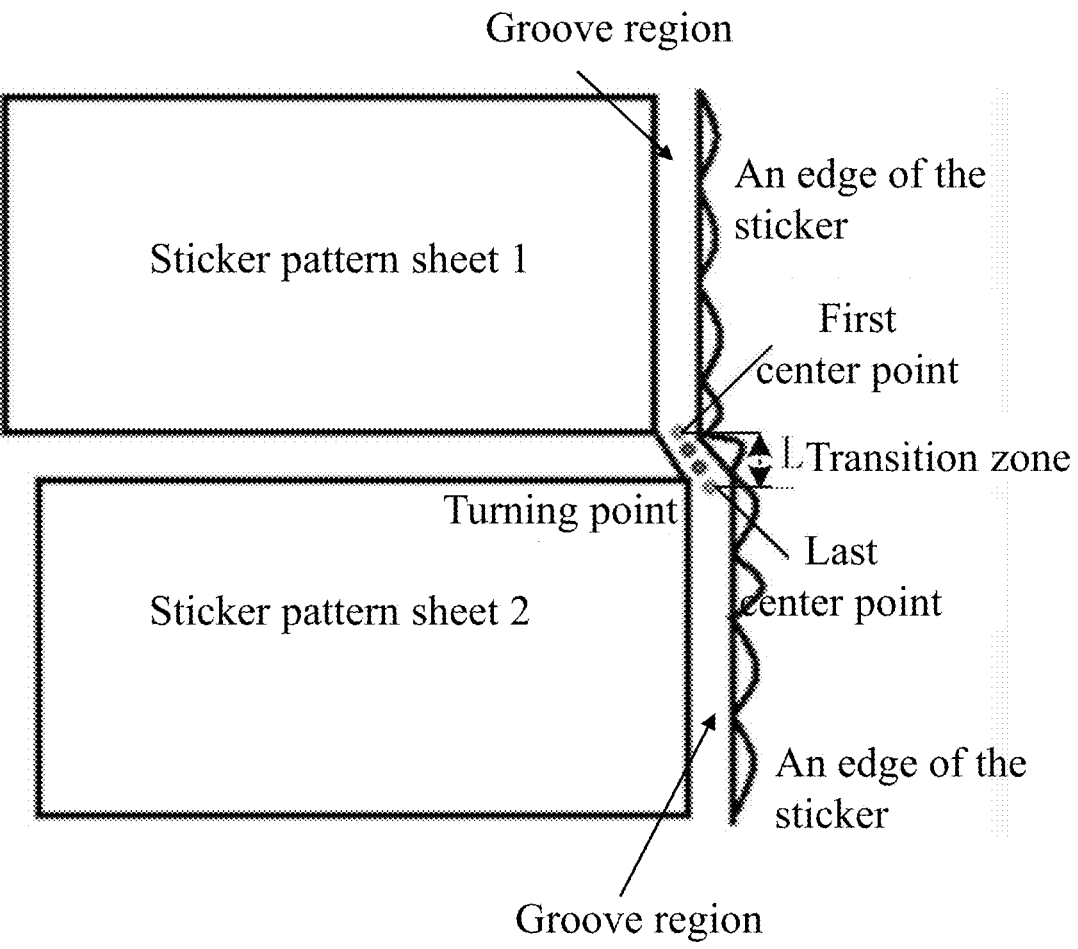
FIG. 11 is a flowchart illustrating an exemplary process for determining coordinates of a center point in a motion direction according to some embodiments of the present disclosure.
Figure 13:
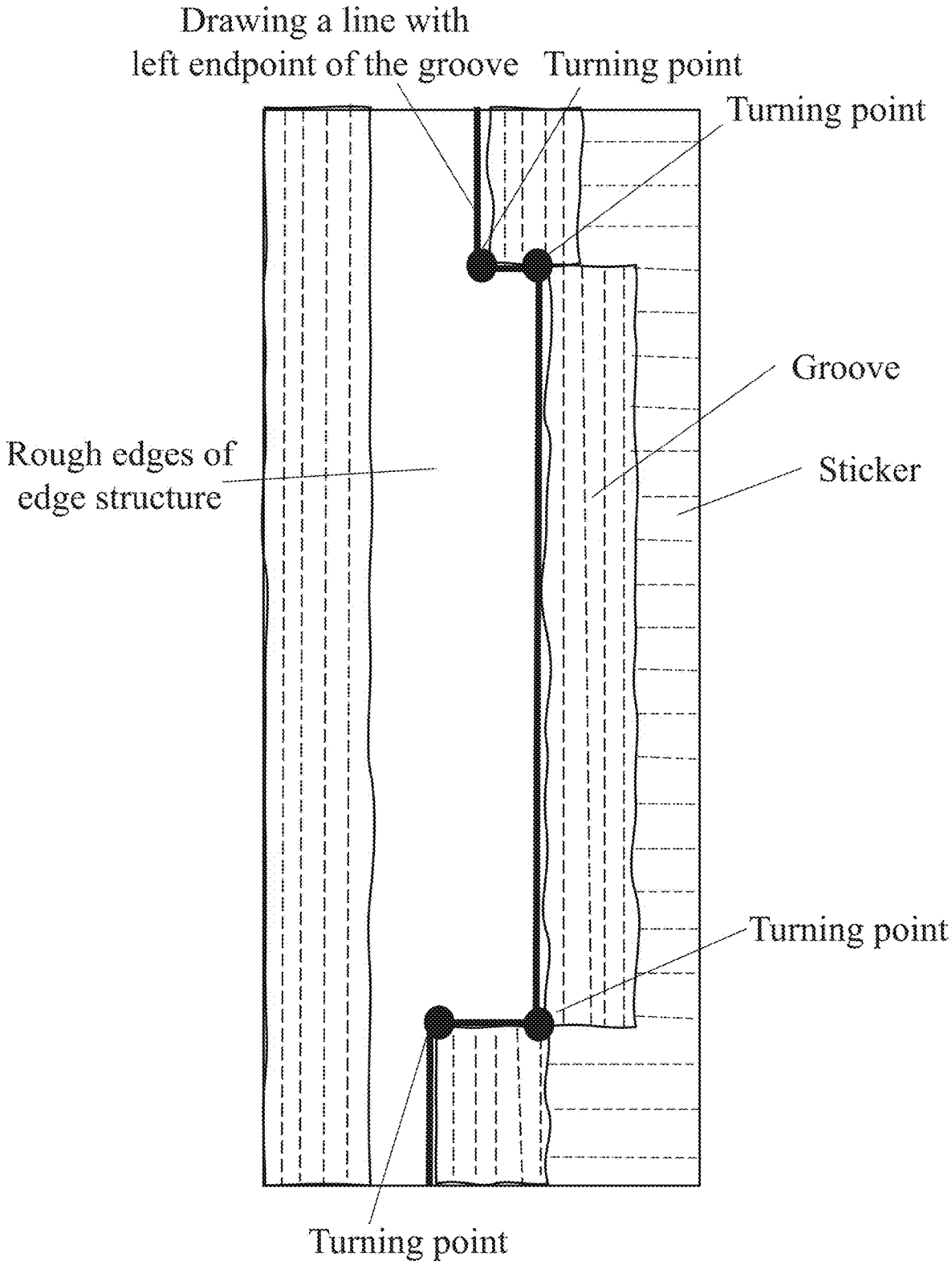
FIG. 13 is a schematic diagram illustrating an exemplary motion trajectory of at least one working head on a subject according to some embodiments of the present disclosure.

In some embodiments, if the coordinates of each endpoint in the set of endpoints are discontinuous in the motion direction, there may be a transition zone between edge structures (or two adjacent sub-structures of a same edge structure) of at least two subjects. The first coordinate information and the second coordinate information may refer to coordinate values of endpoints or center points of the edge structures (or two adjacent sub-structures of the same edge structure) of the two subjects adjacent to the transition zone in the motion direction. As shown in FIG. 11, the first coordinate information may include coordinate values of a center point closest to an transition zone in the motion direction in a set of center points of the edge structure of the sticker pattern sheet 1. The second coordinate information may include coordinate values in the motion direction of a center point closest to the transition zone in a set of center points of an edge structure of the sticker pattern sheet 2.

In 1020, a distance between the coordinates of the two adjacent endpoints in the motion direction may be determined.

In some embodiments, as shown in FIG. 11, the coordinates of two adjacent endpoints may be the first coordinate information and the second coordinate information, respectively. A distance between the first coordinate information and the second coordinate information in the motion direction may be represented by L.

In 1030, a count of at least one turning point may be determined based on a count of image frames corresponding to the distance.

In some embodiments, a first frame identifier and a second frame identifier corresponding to the two adjacent endpoints may be determined, respectively. The count of image frames corresponding to the distance may be determined based on the first frame identifier and the second frame identifier. Thus, the count of the at least one turning point may be equal to the count of image frames.

In some embodiments, the first frame identifier and the second frame identifier corresponding to the two adjacent endpoints may be frame identifiers of images corresponding to an endpoint in a scan, or identifiers of the encoder that triggers a high-precision measuring device (e.g., a 3D line laser measuring instrument) to scan the images corresponding to the endpoint.

In 1040, coordinates of the at least one turning point may be determined based on the distance and the count of the at least one turning point.

In some embodiments, the coordinates of the at least one turning point may be determined based on the frame identifiers corresponding to the two adjacent endpoints respectively. For example, the count of image frames corresponding to the distance may be determined based on the first frame identifier and the second frame identifier corresponding to the two adjacent endpoints, thus the at least one turning point corresponding to the count of image frames on a line segment composed of the two adjacent endpoints may be determined. More descriptions for determining the coordinates of the at least one turning point based on the distance and the count of the at least one turning point may refer to FIG. 12 and related description thereof.

It should be noted that the above description of operation 440 is merely for illustration, and does not limit the scope of application of the present disclosure. For those skilled in the art, various modifications and changes can be made to operation 440 under the guidance of the present disclosure. However, these modifications and changes are still within the scope of the present disclosure.

FIG. 12 is a flowchart illustrating another process for determining at least one turning point according to some embodiments of the present disclosure. In some embodiments, operation 1040 in FIG. 10 may be performed according to process 1200 as illustrated in FIG. 12.

In 1210, a first frame identifier and a second frame identifier corresponding to the two adjacent endpoints may be determined, respectively.

In some embodiments, as shown in FIG. 11, an endpoint in the set of endpoints with direction change in the motion direction may be a center point closest to the transition zone in the sticker pattern 1. The other endpoint in the set of endpoints with change in the motion direction may be a center point closest to the transition zone in the sticker pattern 2.

In some embodiments, a trigger signal may be transmitted by marking the anti-skid roller of the encoder rotates for one circle with a frame identifier, and the trigger signal may be transmitted to the high-precision measuring device based on the control assembly to trigger the high-precision measuring device to scan the edge structure of the subject. Therefore, when an ID of the encoder changes once, the high-precision measuring device may collect an image frame. The frame identifier of the image may be increased by 1 based on a previous frame identifier, and the ID of the encoder may also be increased by 1 accordingly. The ID of the encoder and the frame identifier of the image may be changed synchronously.

In 1220, the count of image frames corresponding to the distance may be determined based on the first frame identifier and the second frame identifier.

In some embodiments, a difference between the first frame identifier and the second frame identifier may be the count of image frames between the two adjacent endpoints, and the count of image frames between the two adjacent endpoints may also be referred to as the count of image frames included in the transition zone.

In 1230, the at least one turning point corresponding to the count of the at least one turning point may be determined on a line segment composed of the two adjacent endpoints.

In some embodiments, the two adjacent endpoints with discontinuous coordinates in the motion direction may be configured to form a line segment, and a length of the line segment in the motion direction may be divided according to the count of image frames determined based on the first frame identifier and the second frame identifier, thus the count of the at least one turning point may be determined as M, and M of turning points may form a set of transition turning points. M of turning points between the two adjacent endpoints may be distributed in the motion direction with the same interval. In some embodiments, the line segment composed of two adjacent endpoints whose coordinates are discontinuous in the motion direction may be a curve, such as an arc, a polyline, or the like.

It should be noted that the above description of process 1200 is merely for illustration, and does not limit the scope of application of the present disclosure. For those skilled in the art, various modifications and changes can be made to process 1200 under the guidance of the present disclosure. However, these modifications and changes are still within the scope of the present disclosure.

When applying the method for motion control provided in the embodiment of modifications, in order to achieve excellent results, a motion trajectory (and a turning trajectory) of at least one working head may be determined on a depth map of an edge structure of a subject scanned by a high-precision measuring device. Specifically, point cloud data of each image frame collected by the high-precision measuring device may be stored, and an ID of an encoder may be accumulated in a motion direction of the subject to obtain all point cloud data corresponding to the subject. Then, all the point cloud data may be projected into the depth map. Then at least one turning point of the subject may be projected to the depth map, the at least one turning point may be marked. Finally, adjacent turning points may be connected, the motion trajectory of the at least one working head on the subject and the turning trajectory may be obtained. The motion trajectory of the at least one working head on the subject may be shown in FIG. 13.

Figure 14:
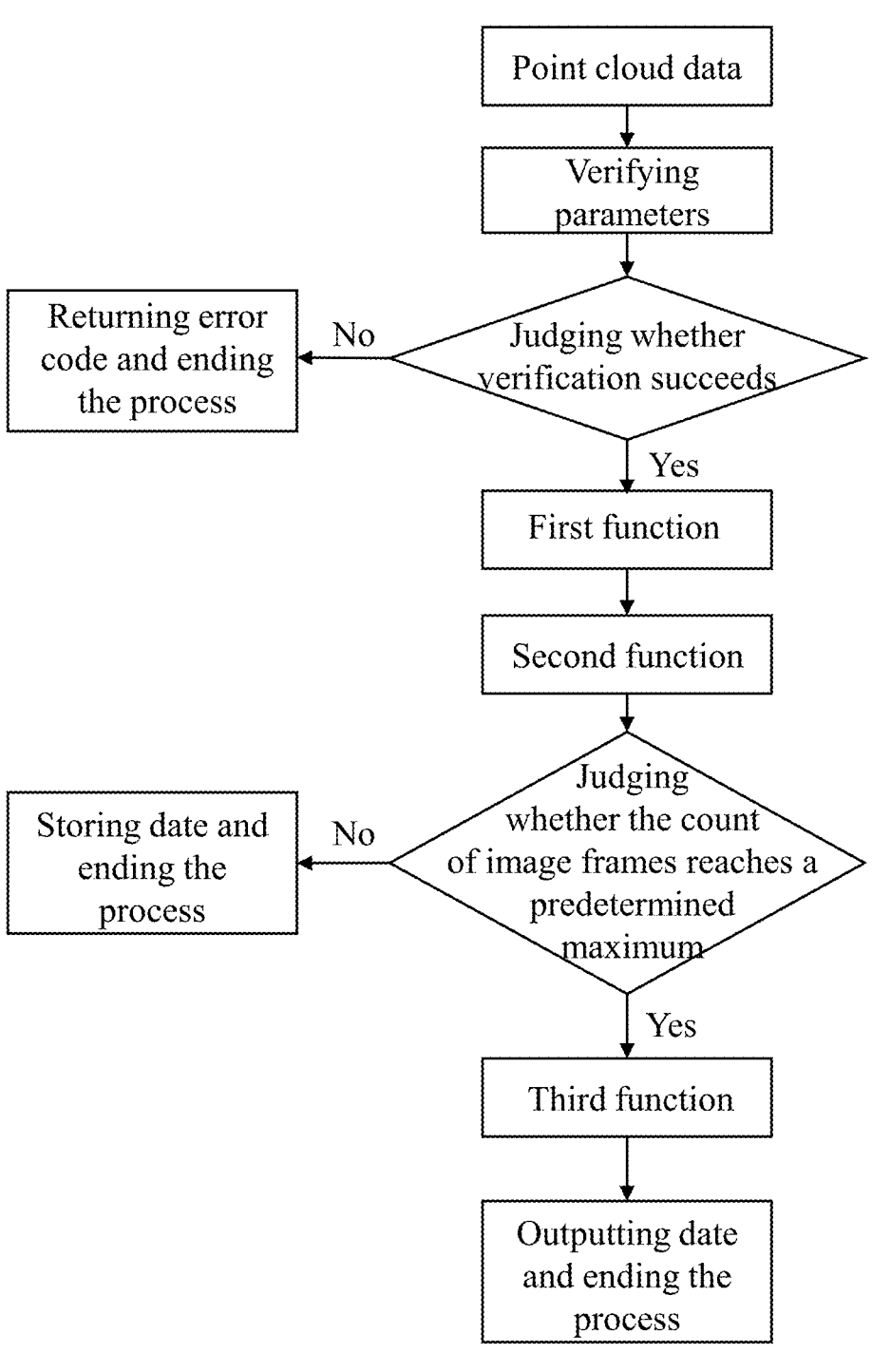
FIG. 14 is a flowchart illustrating a process for performing some operations on a subject according to some embodiments of the present disclosure.

FIG. 14 shows a flowchart illustrating a process for processing the subject according to some embodiments of the present disclosure. After the point cloud data of the subject is obtained, the point cloud data may be verified to determine whether the point cloud data is valid data. Verifying the point cloud data may include determining whether the count of the point cloud data is reasonable (e.g., whether the count of the point cloud data is 0, a determination that the count of the point cloud data is 0 is unreasonable), determining whether a pointer of the point cloud data is empty, or the like. If verification fails, an error code may be returned to end the process. If the verification is successful, coordinates of an endpoint of a frame image may be identified based on a first function. The second function may store the coordinates of the endpoint, thus the coordinates of the endpoint of an operation point may be transmitted when the operation point of the subject reaches below the at least one working head. When the count of image frames reaches a predetermined maximum, a third function may construct coordinates of a center point based on the coordinates of the endpoint.

Figure 15:
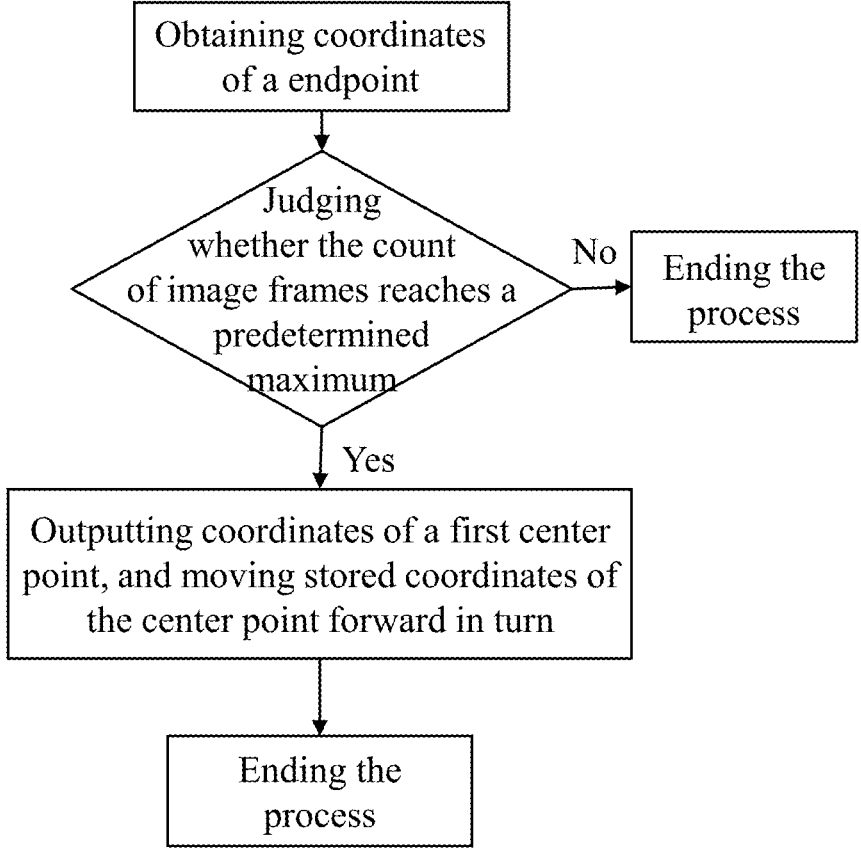
FIG. 15 is a flowchart illustrating a process for transmitting a coordinate of an operating point by using an updating function according to some embodiments of the present disclosure.

In some embodiments, center point data of the currently stored edge structure may be output and rearranged by updating the center point data of the currently stored edge structure based on an update function. And data corresponding to the operation point may be transmitted when the at least one working head reaches a cutting point. For example, FIG. 15 shows a flowchart illustrating a process for transmitting coordinates corresponding to the operation point by using the update function according to some embodiments of the present disclosure. The coordinates of the endpoint may be obtained based on the update function, whether the count of image frames reaches a predetermined maximum may be determined. If the predetermined maximum is reached, an operation process may be started, coordinates of a first center point may be output, and stored coordinates of the center point may be moved forward in turn. When the at least one working head reaches the operation point, the stored coordinates of the first center point may be output, and a storage order of the stored coordinates of other center points except the first center point may be moved forward in turn.

Figure 16:
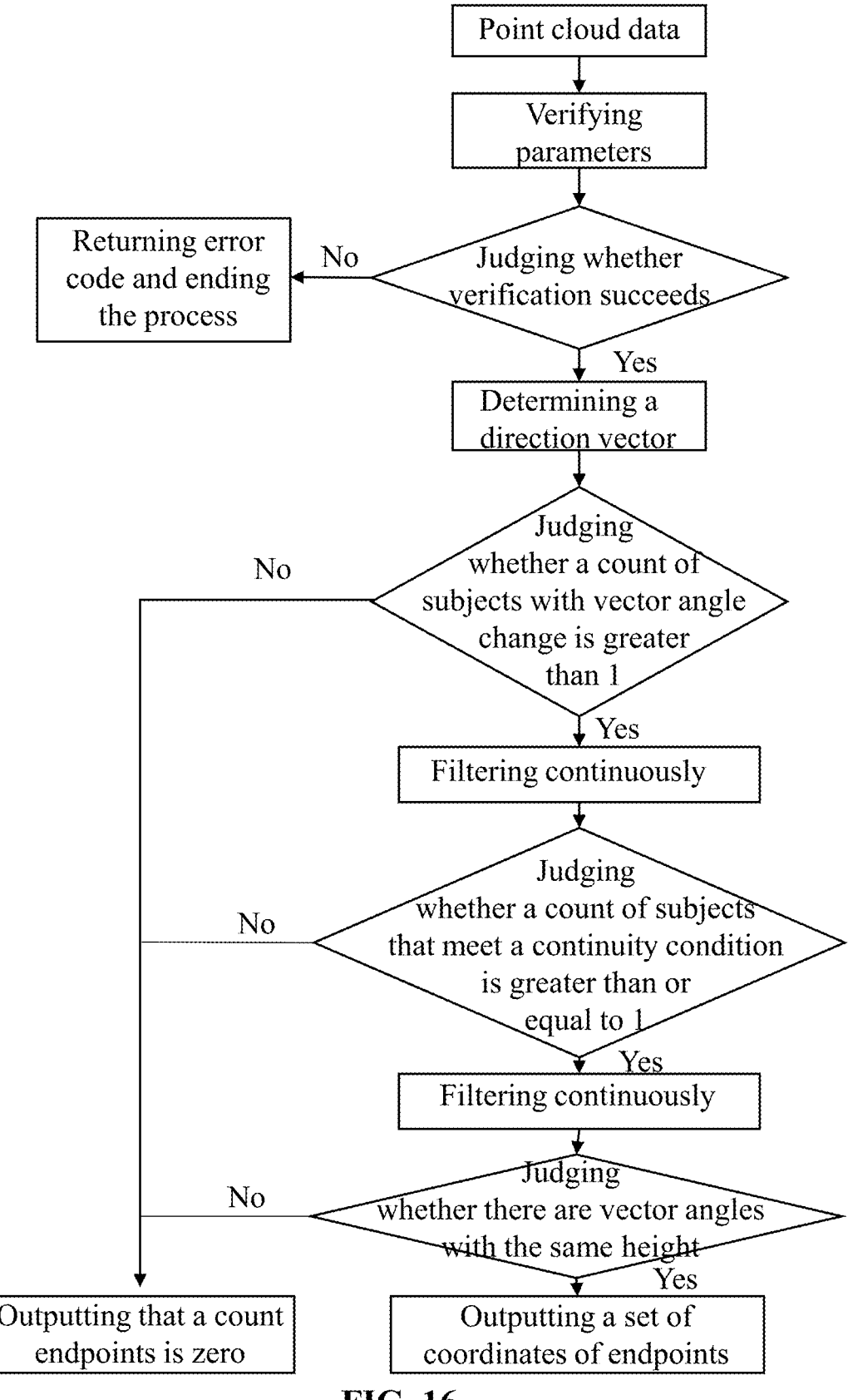
FIG. 16 is a flowchart illustrating a process for recognizing a coordinate of an endpoint of a frame by using a first function according to some embodiments of the present disclosure.

For example, FIG. 16 shows a flowchart illustrating a process for using the first function to identify the coordinates of the endpoint of an image frame according to some embodiments of the present disclosure. Whether a count of subjects with vector angle change is greater than 1 may be determined based on a set of vector angles of a direction vector with a certain point cloud data as a vertex in the point cloud data of the image frame image when determining the point cloud data of the image frame. If the count of subjects with vector angle change is greater than 1, the continuity of the point cloud data of the image may be determined. And if a count of subjects that meet a continuity condition is greater than or equal to 1, a vector angle may be judged based on a height. If there are vector angles with the same height, a set of coordinates of endpoints may be output.

Figure 17:
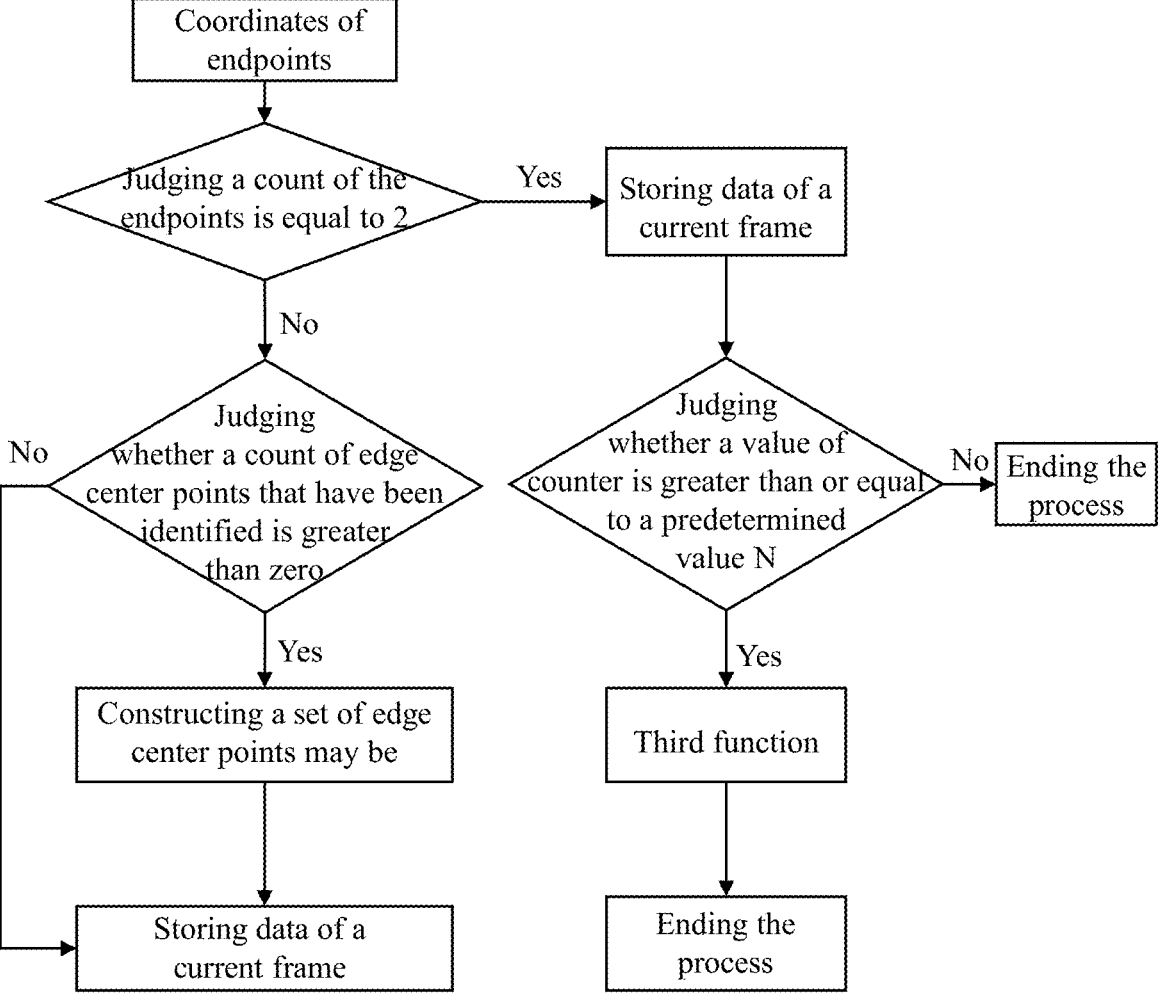
FIG. 17 is a flowchart illustrating a process for storing a coordinate of an endpoint by using a second function according to some embodiments of the present disclosure.

In some embodiments, FIG. 17 shows a flowchart illustrating a process for using the second function to store the coordinates of endpoints according to some embodiments of the present disclosure. If the count of endpoints is not equal to 2, whether a count of edge center points that have been identified is greater than zero may be further determined. When the count of edge center points that have been identified is greater than zero, a set of edge center points may be constructed. Specifically, a counter count1 may be started. Each time an edge center point is identified, a value of the counter count1 may increase by 1. If the count of endpoints is equal to 2, data of a current frame may be stored. When a value of counter count1 is greater than or equal to a predetermined value N, the third function may be started to determine the coordinates of the center points.

Figure 18:
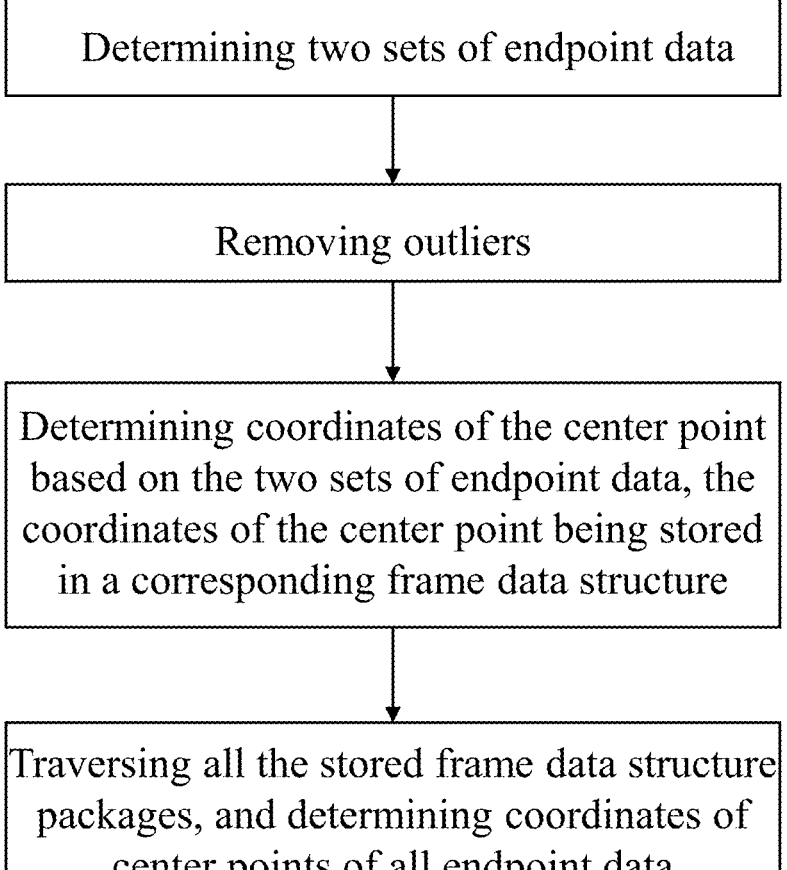
FIG. 18 is a flowchart illustrating a process for determining coordinates of a center point by using a third function according to some embodiments of the present disclosure.

In some embodiments, FIG. 18 is a flowchart illustrating a process of determining coordinates of a center point by using a third function according to some embodiments of the present disclosure. Two sets of endpoint data composed of two endpoints respectively may be filtered to remove outliers. The coordinates of the center point may be determined based on the two sets of endpoint data, and the coordinates of the center point may be stored in a corresponding frame data structure. All the stored frame data structure packages may be traversed, and coordinates of center points of all endpoint data may be determined.

It should be noted that the embodiment of the present disclosure takes an operation point as a midpoint of an edge structure as an example, and an actual operation point may also be an endpoint of the edge structure or other points with geometric characteristics. In the embodiment of the present disclosure, an image of a subject may be collected by a high-precision measuring device to obtain 3D point cloud data. A transition center point may be determined based on the 3D point cloud data, and the measurement accuracy of the coordinate information of the transition center point may be 0.05 mm. At the same time, when the at least one working head performing operations on the subject, a contour curve of the operations may not need to be prepared in advance. As long as the subject has certain geometric features, the geometric features may be performed an image acquisition operation and operation points of the geometric features may be identified.

Figure 19:
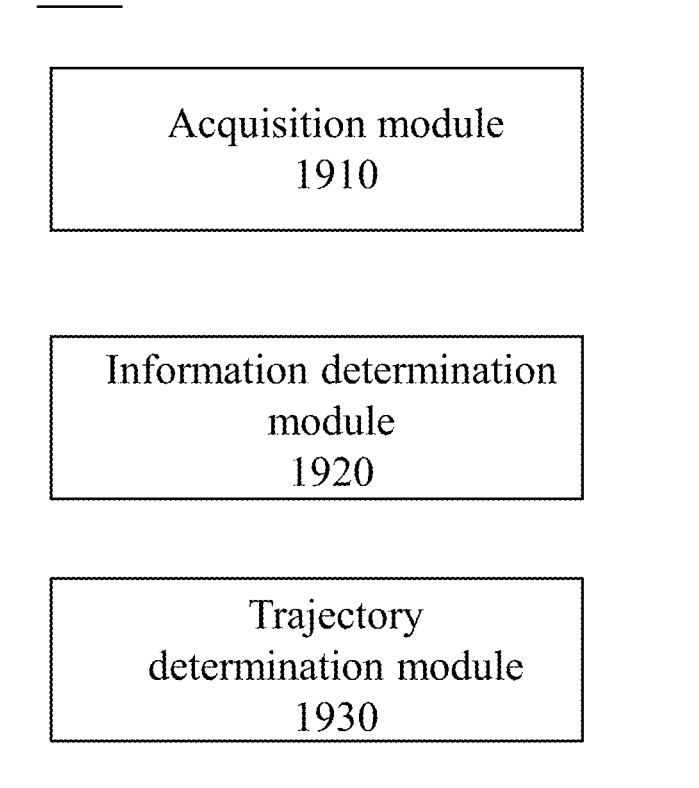
FIG. 19 is a block diagram illustrating an exemplary system for controlling a motion trajectory of at least one working head according to some embodiments of the present disclosure.

FIG. 19 is a block diagram illustrating an exemplary system for controlling a motion trajectory of at least one working head according to some embodiments of the present disclosure.

In some embodiments, as shown in FIG. 19, a system 1900 for motion control of at least one working head may include an acquisition module 1910, an information determination module 1920, and a trajectory determination module 1930. The acquisition module 1910 may be configured to obtain a target region of a subject based on a scan of a high-precision measuring device. The information determination module 1920 may be configured to determine depth information corresponding to the target region based on the target region. The trajectory determination module 1930 may be configured to determine a motion trajectory of the at least one working head based on the depth information.

In some embodiments, the information determination module 1920 may be configured to determine scanning information of the high-precision measuring device based on coding information of an encoder. Based on the scanning information, the depth information may be determined. In some embodiments, the information determination module 1920 may be configured to determine a motion region of the at least one working head based on the depth information. The motion trajectory may be determined based on the motion region. In some embodiments, the information determination module 1920 may be configured to determine a motion reference path of the at least one working head based on the motion region and a motion direction; and determine the motion trajectory based on the motion reference path. In some embodiments, the motion reference path may include a center line path of the motion region or a path parallel to the center line in the motion region. In some embodiments, the trajectory determination module 1930 may be configured to determine whether two adjacent sub-regions among the plurality of sub-regions are continuous in the motion direction; and determine whether to add a turning trajectory based on a determination whether the two adjacent sub-regions among the plurality of sub-regions are continuous in the motion direction. In some embodiments, in response to a determination the two adjacent sub-regions among the plurality of sub-regions are not continuous in the motion direction, the turning trajectory may be added in a deviation region between the two adjacent sub-regions.

In some embodiments, the system 1900 for motion control of at least one working head may also include a motion control module 1940 configured to control the at least one working head to move based on the motion trajectory of the at least one working head. In some embodiments, the at least one working head may include a first working head and a second working head, a distance between the first working head and the second working head is constant. The controlling the at least one working head to move based on the motion trajectory of the at least one working head may include: controlling the first working head and the second working head to move based on the motion trajectory of the first working head. In some embodiments, the at least one working head may include a first working head and a second working head, the motion trajectory of the at least one working head may include a first motion trajectory of the first working head and a second motion trajectory of the second working head. The controlling the at least one working head to move based on the motion trajectory of the at least one working head may include: controlling the first working head to move based on the first motion trajectory, and controlling the second working head to move based on the second motion trajectory.

In some embodiments, the acquisition module 1910 may be configured to obtain point cloud data of the target region based on the target region of the subject; and the information determination module 1920 may be configured to determine a set of endpoints of the target region based on the point cloud data of the target region, wherein the depth information may include the point cloud data and the set of endpoints.

In some embodiments, the determining a set of endpoints of the target region based on the point cloud data of the target region may include: determining second point cloud data and third point cloud data whose distances from the first point cloud data are first distance, the first point cloud data in the point cloud data being designated as a starting point; obtaining a vector angle by determining an angle between a first vector and a second vector, wherein the first vector may be composed of the first point cloud data and the second point cloud data, and the second vector may be composed of the first point cloud data and the third point cloud data; obtaining a set of vector angles by traversing the point cloud data; and determining a first set of endpoints and a second set of endpoints based on the set of vector angles, wherein the first set of endpoints and the second set of endpoints may belong to the set of endpoints.

In some embodiments, the determining a set of endpoints of the target region based on the point cloud data of the target region may include: determining second point cloud data and third point cloud data whose distance from the first point cloud data is a first distance, the first point cloud data in the point cloud data being designated as a starting point; obtaining a vector angle by determining an angle between a first vector and a second vector, wherein the first vector may be composed of the first point cloud data and the second point cloud data, and the second vector may be composed of the first point cloud data and the third point cloud data; obtaining a set of vector angles by traversing the point cloud data; determine a first set of endpoints and a second set of endpoints based on the set of vector angles; and determining a set of center points based on the first set of endpoints and the second set of endpoints, wherein the set of center points belongs to the set of endpoints.

In some embodiments, the determining a first set of endpoints and a second set of endpoints based on the set of vector angles may include: obtaining a subset of vector angles, in the set of vector angles, whose tangent values are greater than a first threshold; obtaining a first candidate set of endpoints by determining point cloud data, in point cloud data corresponding to the subset of vector angles, whose intervals meet a distance threshold condition; obtaining a second candidate set of endpoints by determining point cloud data, in the first candidate set of endpoints, corresponding to vector angles whose height differences are less than a second threshold; and determining the first set of endpoints and the second set of endpoints included in the second candidate set of endpoints based on direction information of the vector angles corresponding to the point cloud data in the second candidate set of endpoints.

In some embodiments, the trajectory determination module 1930 may be configured to: determine whether coordinates of endpoints in the set of endpoints are continuous in the motion direction; in response to a determination the coordinates of endpoints in the set of endpoints are not continuous in the motion direction, determine at least one turning point between two adjacent endpoints based on the coordinates of the two adjacent endpoints that are not continuous in the set of endpoints, wherein the at least one turning point is configured to determine the turning trajectory.

In some embodiments, the determining at least one turning point between two adjacent endpoints based on the coordinates of the two adjacent endpoints that are not continuous in the set of endpoints may include: determining a distance between the coordinates of the two adjacent endpoints in the motion direction; determining a count of the at least one point based on a count of image frames corresponding to the distance; and determining coordinates of the at least one turning point based on the distance and the count of the least one turning point. In some embodiments, the determining a count of the at least one turning point based on a count of image frames corresponding to the distance may include: determining a first frame identifier and a second frame identifier corresponding to the two adjacent endpoints, respectively; determining the count of image frames corresponding to the distance based on the first frame identifier and the second frame identifier; and determining that the count of the at least one turning points is equal to the count of image frames. In some embodiments, the determining coordinates of the at least one turning point based on the distance and the count of the at least one turning point may include: determining the at least one turning point corresponding to the count of the at least one turning point on a line segment composed of the two adjacent endpoints; wherein the at least one turning point may be located between the two adjacent endpoints, and the distance between two adjacent turning points among the at least one turning point in the motion direction may be equal.

In some embodiments, the trajectory determination module 1940 may be configured to: control the at least one working head to move with direction change based on the at least one turning point. In some embodiments, the controlling the at least one working head to move with direction change based on the at least one change point may include: determining a frame identifier corresponding to each of the at least one turning point; and controlling the at least one working head to move with direction change based on the at least one turning point when an encoder triggers the high-precision measuring device to scan the target region corresponding to the frame identifier.

Figure 20:
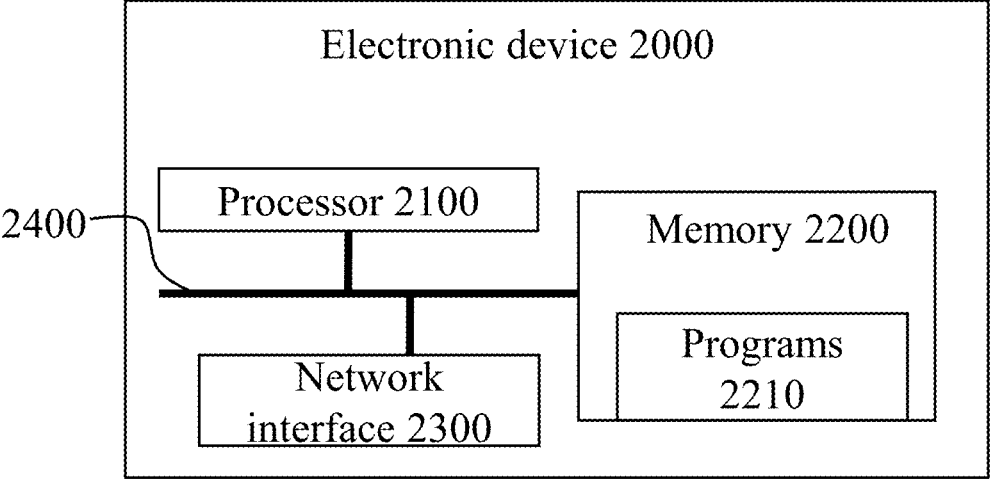
FIG. 20 is a structure diagram illustrating an exemplary hardware composition of an electronic device according to some embodiments of the present disclosure.

FIG. 20 is a structure diagram illustrating an exemplary hardware composition of an electronic device according to some embodiments of the present disclosure.

The embodiments of the present disclosure may provide an electronic device. The electronic device may include memory configured to store executable instructions; and a processor configured to perform methods provided in the embodiments of the present disclosure when executing executable instructions stored in the memory.

For example, as shown in FIG. 20, the electronic device 200 may include at least one processor 2100, memory 2200, and at least one network interface 2300. Various assemblies in the electronic device 2000 may be coupled by a bus system 2400. It should be understood that the bus system 2400 is used to realize a communication between these assemblies. The bus system 2400 may include a power bus, a control bus, a status signal bus in addition to a data bus, or the like, or a combination thereof.

It should be understood that the memory 2200 may be volatile memory or nonvolatile memory, and may include the volatile memory and the nonvolatile memory. The non-volatile memory may be read-only memory (ROM), pro-grammable read-only memory (PROM), erasable program-mable read-only memory (EPROM), electrically erasable programmable read-only memory (EEPROM), magnetic random access memory (FRAM), flash memory, magnetic surface memory, optical disc, or compact disc read-only memory (CD-ROM). The magnetic surface memory may be magnetic disk memory or magnetic tape memory. The volatile memory may be a random access memory (RAM), which is used as an external cache. Merely by way of example, many forms of RAM may be available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchro-nous dynamic random access memory (ESDRAM), synclink dynamic random access memory (SLDRAM), direct rambus random access memory (DRRAM). The memory 2200 described in the embodiments of the present disclosure may include, but not limited to, these types of memory, or any other types of memory.

The memory 2200 in the embodiment of the present disclosure may be configured to store various types of data to support operations of the electronic device 2000. The data may include any computer programs, such as programs 2210, for implementing on the electronic device 2000. A program for implementing methods of the embodiment of the present disclosure may be included in the programs 2210.

The methods disclosed in the embodiments of the present disclosure may be applied to or implemented by the pro-cessor 2100. The processor 2100 may be an integrated circuit chip with signal processing capability. In a process of implementing the method, each operation of the above methods may be implemented by an integrated logic circuit of hardware or an instruction in the form of software in the processor 2100. The processor 2100 may be a general-purpose processor, a digital signal processor (DSP), or other programmable logic devices, discrete gate or transistor logic devices, discrete hardware components, or the like. The processor 2100 may implement or execute the methods, operations, and logic block diagrams disclosed in the embodiments of the present disclosure. A general-purpose processor may be a microprocessor or any conventional processor. The operations of the methods disclosed in com-bination with the embodiments of the present disclosure may be directly reflected in the execution completion of the hardware decoding processor, or the combination of the hardware and software modules in the decoding processor. A software module may be located in a storage medium, which may be located in the memory 2200, and the proces-sor 2100 may read information in the memory 2200 and implement the operations of the above methods in combi-nation with the hardware.

In an exemplary embodiment, the electronic device 2000 may be implemented by one or more application specific integrated circuits (ASICs), DSPs, programmable logic devices (PLDs), complex programmable logic devices (CPLDs), field programmable gate arrays (FPGAs), general-purpose processors, controllers, microcontroller units (MCUs), microprocessor units (MPUs), or other electronic components for performing the above methods.

The embodiment of the present disclosure may provide a computer program product or computer program, storing computer instructions in a computer-readable storage medium. The processor of a computer device may read the computer instructions from the computer-readable storage medium, and the processor may execute the computer instructions to cause the computer device to perform the method for motion control described in the embodiments of the present disclosure.

The embodiment of the present disclosure may provide a computer-readable storage medium, storing executable instructions, when executed by a processor, being config-ured to perform the method provided in the embodiment of the present disclosure, for example, the method for motion control of at least one working head shown in FIGS. 1 to 18.

In some embodiments, the computer-readable storage medium may be memory such as FRAM, ROM, PROM, EPROM, EEPROM, flash memory, magnetic surface memory, optical disk, or CD-ROM, or may be various devices including one or any combination of the above memory.

In some embodiments, the computer instructions may be written in any form of programming language (including compilation or interpretation language, or declarative or procedural language), such as a form of software, software module, script or code, and may be deployed in any form, including being deployed as a stand-alone program or as a module, component, subroutine or other unit suitable for use in a computing environment.

For example, the computer instructions may be, but not necessarily correspond to files in the file system, may be stored in a portion of a file that holds other programs or data, for example, in one or more scripts in a hyper text markup language (HTML), in a single file dedicated to the program in question, or, in a plurality of collaboration files (e.g., a file that stores one or more modules, subroutines, or portions of code).

For example, the computer instructions may be deployed to execute on one computing device, or on a plurality of computing devices located in one position, or on a plurality of computing devices distributed in a plurality of positions and interconnected by a communication network.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exem-plary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appre-ciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as an "data block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:
1. A method for motion control of at least one working head, comprising:
    obtaining a target region of a subject based on a scan of
      a high-precision measuring device;

35

36 determining depth information corresponding to the target region based on the target region, wherein the depth information includes point cloud data and a set of endpoints, the determining depth information further comprising:

obtaining the point cloud data of the target region based on the target region of the subject; and determining the set of endpoints of the target region based on the point cloud data of the target region; and determining a motion trajectory of the at least one working head based on the depth information, comprising:

determining whether coordinates of endpoints in the set of endpoints are continuous in motion direction;

in response to determining the coordinates of endpoints in the set of endpoints are not continuous in the motion direction, determining at least one turning point between two adjacent endpoints based on coordinates of the two adjacent endpoints that are not continuous in the set of endpoints, wherein the at least one turning point is configured to determine a turning trajectory.

2. The method of claim 1, further comprising:

determining scanning information of the high-precision measuring device based on coding information of an encoder; and determining the depth information based on the scanning information.

3. The method of claim 1, wherein the determining a motion trajectory of the at least one working head based on the depth information includes:

determining a motion region of the at least one working head based on the depth information; and determining the motion trajectory based on the motion region.

4. The method of claim 3, wherein the determining the motion trajectory based on the motion region includes:

determining a motion reference path of the at least one working head based on the motion region and the motion direction; and determining the motion trajectory based on the motion reference path.

5. The method of claim 3, wherein the motion region includes a plurality of sub-regions, and the determining the motion trajectory based on the motion region includes:

determining whether two adjacent sub-regions among the plurality of sub-regions are continuous in the motion direction; and determining whether to add the turning trajectory based on a determination whether the two adjacent sub-regions among the plurality of sub-regions are continuous in the motion direction.

6. The method of claim 5, wherein the determining whether to add the turning trajectory based on a determination whether the two adjacent sub-regions among the plurality of sub-regions are continuous in the motion direction includes:

in response to a determination the two adjacent sub-regions among the plurality of sub-regions are not continuous in the motion direction, adding the turning trajectory in a deviation region between the two adjacent sub-regions.

7. The method of claim 1, wherein the at least one working head includes a first working head and a second working head, a distance between the first working head and the second working head is constant, and the method further includes:

controlling the first working head and the second working head to move based on the motion trajectory of the first working head.

8. The method of claim 1, wherein the at least one working head includes a first working head and a second working head, the motion trajectory of the at least one working head includes a first motion trajectory of the first working head and a second motion trajectory of the second working head, and the method further includes:

controlling the first working head to move based on the first motion trajectory; and controlling the second working head to move based on the second motion trajectory.

9. The method of claim 1, wherein the determining the set of endpoints of the target region based on the point cloud data of the target region includes:

determining second point cloud data and third point cloud data whose distances from first point cloud data are first distance, the first point cloud data in the point cloud data being designated as a starting point;

obtaining a vector angle by determining an angle between a first vector and a second vector, wherein the first vector is composed of the first point cloud data and the second point cloud data, and the second vector is composed of the first point cloud data and the third point cloud data;

obtaining a set of vector angles by traversing the point cloud data; and determining a first set of endpoints and a second set of endpoints based on the set of vector angles, wherein the first set of endpoints and the second set of endpoints belong to the set of endpoints or a set of center points determined based on the first set of endpoints and the second set of endpoints belongs to the set of endpoints.

10. The method of claim 9, wherein the determining a first set of endpoints and a second set of endpoints based on the set of vector angles includes:

obtaining a subset of vector angles, in the set of vector angles, whose tangent values are greater than a first threshold;

obtaining a first candidate set of endpoints by determining point cloud data, in point cloud data corresponding to the subset of vector angles, whose intervals meet a distance threshold condition;

obtaining a second candidate set of endpoints by determining point cloud data, in the first candidate set of endpoints, corresponding to vector angles whose height differences are less than a second threshold; and determining the first set of endpoints and the second set of endpoints included in the second candidate set of endpoints based on direction information of the vector angles corresponding to the point cloud data in the second candidate set of endpoints.

11. The method of claim 1, wherein the determining at least one turning point between two adjacent endpoints based on coordinates of the two adjacent endpoints that are not continuous in the set of endpoints includes:

determining a distance between the coordinates of the two adjacent endpoints in the motion direction;

determining a count of the at least one turning point based on a count of image frames corresponding to the distance; and determining coordinates of the at least one turning point based on the distance and the count of the at least one turning point.

12. The method of claim 11, wherein the determining a count of the at least one turning point based on a count of image frames corresponding to the distance includes:

determining a first frame identifier and a second frame identifier corresponding to the two adjacent endpoints, respectively;

determining the count of image frames corresponding to the distance based on the first frame identifier and the second frame identifier; and determining that the count of the at least one turning point is equal to the count of image frames.

13. The method of claim 12, wherein the determining coordinates of the at least one turning point based on the distance and the count of the at least one turning point includes:

determining the at least one turning point corresponding to the count of the at least one turning point on a line segment composed of the two adjacent endpoints; wherein the at least one turning point is located between the two adjacent endpoints, and the distance between two adjacent turning points among the at least one turning point in the motion direction is equal.

14. The method of claim 1, further comprising:

controlling the at least one working head to move with direction change based on the at least one turning point.

15. The method of claim 14, wherein the controlling the at least one working head to move with direction change based on the at least one change point includes:

determining a frame identifier corresponding to each of the at least one turning point; and controlling the at least one working head to move with direction change based on the at least one turning point when an encoder triggers the high-precision measuring device to scan the target region corresponding to the frame identifier.

16. An electronic device, comprising:

memory configured to store executable instructions; and a processor configured to perform a method when executing executable instructions stored in the memory, the method includes:

obtaining a target region of a subject based on a scan of a high-precision measuring device;

determining depth information corresponding to the target region based on the target region, wherein the depth information includes point cloud data and a set of endpoints, the determining depth information further comprising:

obtaining the point cloud data of the target region based on the target region of the subject; and determining the set of endpoints of the target region based on the point cloud data of the target region; and determining a motion trajectory of the at least one working head based on the depth information, comprising:

determining whether coordinates of endpoints in the set of endpoints are continuous in motion direction;

in response to determining the coordinates of endpoints in the set of endpoints are not continuous in the motion direction, determining at least one turning point between two adjacent endpoints based on coordinates of the two adjacent endpoints that are not continuous in the set of endpoints, wherein the at least one turning point is configured to determine a turning trajectory.

17. A motion control device for at least one working head, comprising:

an operation platform;

a high-precision measuring device arranged on the operation platform;

at least one working head; and a control assembly configured to control a motion trajectory of the at least one working head based on scanning information of the high-precision measuring device, wherein the high-precision measuring device includes a three-dimensional (3D) line laser measuring instrument, the 3D line laser measuring instrument being arranged at one or both ends of the operation platform along a width direction of the operation platform.

* * * * *